(12) United States Patent
Sakagami

(10) Patent No.: US 11,975,723 B2
(45) Date of Patent: May 7, 2024

(54) TRAVEL CONTROL SYSTEM AND TRAVEL CONTROL METHOD

(71) Applicant: HONDA MOTOR CO., LTD., Tokyo (JP)

(72) Inventor: Kyohei Sakagami, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/679,555

(22) Filed: Feb. 24, 2022

(65) Prior Publication Data

US 2022/0324465 A1 Oct. 13, 2022

(30) Foreign Application Priority Data

Mar. 31, 2021 (JP) .................................. 2021-059072

(51) Int. Cl.
*B60W 40/12* (2012.01)
*B60W 30/18* (2012.01)
*B62D 15/02* (2006.01)

(52) U.S. Cl.
CPC ...... *B60W 40/12* (2013.01); *B60W 30/18109* (2013.01); *B62D 15/021* (2013.01); *B60W 2520/26* (2013.01); *B60W 2552/20* (2020.02); *B60W 2554/4049* (2020.02)

(58) Field of Classification Search
CPC .................................................. B60W 40/12
See application file for complete search history.

(56) References Cited

U.S. PATENT DOCUMENTS

| 10,040,450 | B1 * | 8/2018 | Pal ..................... B60W 60/0011 |
| 2008/0004807 | A1 | 1/2008 | Kimura et al. |
| 2019/0256103 | A1 * | 8/2019 | Capua ................. B60W 40/101 |
| 2020/0290625 | A1 * | 9/2020 | Berntorp ......... B60W 30/18172 |

FOREIGN PATENT DOCUMENTS

| JP | 2005239024 A | 9/2005 |
| JP | 2008006922 A | 1/2008 |
| JP | 6773433 A | 10/2020 |

OTHER PUBLICATIONS

Allen, R. Wade, et al. "Vehicle and Tire Modeling for Dynamic Analysis and Real-Time Simulation." SAE Transactions, vol. 109, 2000, pp. 2020-2042. JSTOR, http://www.jstor.org/stable/44687036. Accessed Jan. 16, 2024. (Year: 2000).*

(Continued)

*Primary Examiner* — Peter D Nolan
*Assistant Examiner* — Jacob Kent Besteman-Street
(74) *Attorney, Agent, or Firm* — Armstrong Teasdale LLP

(57) ABSTRACT

A travel control system for a vehicle includes: an external environment recognizing unit that recognizes an obstacle around the vehicle; a tire parameter estimation unit that estimates a tire parameter of a tire of the vehicle; and a travel plan unit that sets a travel route, an amount of acceleration and deceleration, and an amount of turning based on the obstacle and the tire parameter. The travel plan unit sets the travel route, the amount of acceleration and deceleration, and the amount of turning so as to suppress an excess amount of a slip ratio of the tire relative to an adhesion limit slip ratio while avoiding approach to the obstacle.

7 Claims, 13 Drawing Sheets

(56) References Cited

OTHER PUBLICATIONS

Canova, Marcello, et al. "Model-Based Wheel Torque and Backlash Estimation for Drivability Control." SAE International Journal of Engines, vol. 10, No. 3, 2017, pp. 1318-1326. JSTOR, https://www.jstor.org/stable/26285131. Accessed Jan. 16, 2024. (Year: 2017).*

Karjalainen, M. (2016). Real-Time Estimation of Tire Stiffness (Dissertation). Retrieved from https://urn.kb.se/resolve?urn=urn:nbn:se:liu:diva-130878 (Year: 2016).*

Notice of Reasons for Refusal for Japanese Patent Application No. 2021-059072 dated Nov. 11, 2022; 8 pp.

* cited by examiner

TRAVEL CONTROL SYSTEM AND TRAVEL CONTROL METHOD

TECHNICAL FIELD

The present invention relates to a travel control system and a travel control method.

BACKGROUND ART

JP6773433B2 discloses a surrounding risk display device which sets a risk potential at each point based on a distance between the own vehicle and an obstacle around the own vehicle and sets a future travel route of the own vehicle by connecting the points with low risk potentials.

However, the travel route set based on the risk potentials may pass a low μ road, which may include a frozen road surface, a snow-packed road surface, and the like. In this case, the tires may slip unexpectedly so that the vehicle may become unable to travel along the travel route. Also, in such cases as when, during traveling to avoid an obstacle, a new obstacle is detected, the vehicle may not be able to travel along the travel route so that the avoidance may be delayed. Further, there may be a case where the vehicle speed is too high for the vehicle to travel along the travel route. Therefore, it is desirable to perform the vehicle control taking into account the stability of the vehicle behavior in addition to the risk potentials.

SUMMARY OF THE INVENTION

In view of the foregoing background, a primary object of the present invention is to provide a vehicle control system and a vehicle control method which can make the vehicle travel automatically with stable vehicle behavior.

To achieve the above object, one aspect of the present invention provides a travel control system (10) for a vehicle (1), comprising: an external environment recognizing means (31) that recognizes an obstacle around the vehicle; a tire parameter estimation means (22) that estimates a tire parameter of a tire of the vehicle; and a travel plan means (34) that sets a travel route, an amount of acceleration and deceleration, and an amount of turning based on the obstacle and the tire parameter, wherein the travel plan means sets the travel route, the amount of acceleration and deceleration, and the amount of turning so as to suppress an excess amount of a slip ratio of the tire relative to an adhesion limit slip ratio while avoiding approach to the obstacle.

According to this aspect, it is possible to provide a vehicle control system capable of setting a travel route along which the vehicle can travel with stable vehicle behavior. Since the travel plan means sets the travel route, the amount of acceleration and deceleration, and the amount of turning so as to suppress the excess amount of the slip ratio of the tire relative to the adhesion limit slip ratio, the sliding slip is suppressed and the stability of the vehicle behavior is improved. Further, since the travel plan means sets the travel route, the amount of acceleration and deceleration, and the amount of turning based on the tire parameter estimated by the tire parameter estimation means, the vehicle can stabilize the vehicle behavior while traveling along the travel route even if the road surface condition changes. Owing to the suppression of the sliding slip, even when the travel route is changed suddenly due to an obstacle while the vehicle is traveling along the travel route, the vehicle can stabilize the vehicle behavior while traveling. Also, owing to the suppression of the sliding slip, even when the vehicle speed is higher than the target vehicle speed while the vehicle is traveling along the travel route, the vehicle can stabilize the vehicle behavior while traveling.

In the above aspect, preferably, the travel plan means sets the travel route, the amount of acceleration and deceleration, and the amount of turning so as to minimize an evaluation function which is a total of a value obtained by multiplying a risk potential based on a distance between the obstacle and the vehicle by a first coefficient and a value obtained by multiplying a slip loss which increases according to a sliding slip of the tire by a second coefficient.

According to this aspect, the travel control system can set a travel route which can widen the spacing between the vehicle and the obstacle and along which the vehicle can travel with stable vehicle behavior. Also, by changing the first coefficient and the second coefficient, it is possible to adjust the influence of the risk potential and tire slip loss on the evaluation function.

In the above aspect, preferably, the travel plan means sets the travel route, the amount of acceleration and deceleration, and the amount of turning so as to minimize an evaluation function which is a total of a value obtained by multiplying a risk potential based on a distance between the obstacle and the vehicle by a first coefficient, a value obtained by multiplying a slip loss of the tire by a second coefficient, and a value obtained by multiplying a kinetic energy loss which is an amount of decrease of kinetic energy of the vehicle by a third coefficient.

According to this aspect, the travel control system can set a travel route which can widen the spacing between the vehicle and the obstacle and along which the vehicle can travel with stable vehicle behavior and with a small deceleration. Also, by changing the first coefficient, the second coefficient, and the third coefficient, it is possible to adjust the influence of the risk potential, tire slip loss, and kinetic energy loss on the evaluation function.

In the above aspect, preferably, the travel control system further comprises a travel control means (24) that controls a drive source, a braking device, and a steering device, wherein the travel plan means sets a target slip ratio of the tire and a target steering angle when the evaluation function is minimized and calculates a required driving force of the tire based on the target slip ratio, and the travel control means controls the steering device such that an actual steering angle of the tire corresponds to the target steering angle and controls at least one of the drive source and the braking device such that an actual driving force of the tire corresponds to the required driving force.

According to this aspect, since the drive source and the braking device are controlled based on the required driving force of the tire, the control error can be reduced. In a comparative case where control is conducted to make the actual slip ratio correspond to the target slip ratio, if a tire model based on the relationship between the slip ratio and the driving force includes an error, an error will occur in the travel route. In contrast, in the case where control is conducted to make the actual driving force of the tire correspond to the required driving force, if the tire model includes an error, an error may occur in the tire slip loss but the influence on the travel route is small.

In the above aspect, preferably, the tire parameter includes a tire torsional stiffness which is a stiffness of the tire and a road surface friction coefficient which represents friction characteristics between the tire and a road surface, and the tire parameter estimation means estimates the tire torsional stiffness and the road surface friction coefficient based on at least a rotation speed of the drive source, a rotation speed of a wheel body of the tire, a vehicle body speed, and a torque of the wheel body.

According to this aspect, tire slip loss can be acquired based on the tire torsional stiffness and the road surface friction coefficient.

In the above aspect, preferably, the tire parameter estimation means estimates an adhesion limit slip ratio corresponding to an adhesion limit of the tire relative to the road surface based on the tire torsional stiffness and the road surface friction coefficient.

According to this aspect, the tire slip loss can be acquired based on the adhesion limit slip ratio.

According to another aspect of the present invention, there is provided a travel control method to be executed by a travel control system for a vehicle, the method comprising: recognizing an obstacle around the vehicle; estimating a tire parameter of a tire of the vehicle; and setting a travel route, an amount of acceleration and deceleration, and an amount of turning based on the obstacle and the tire parameter so as to suppress an excess amount of a slip ratio of the tire relative to an adhesion limit slip ratio while avoiding approach to the obstacle.

According to this aspect, it is possible to provide a vehicle control method capable of setting a travel route along which the vehicle can travel with stable vehicle behavior. Since the travel route, the amount of acceleration and deceleration, and the amount of turning are set so as to suppress the excess amount of the slip ratio of the tire relative to the adhesion limit slip ratio, the sliding slip is suppressed and the stability of the vehicle behavior is improved. Further, since the travel route, the amount of acceleration and deceleration, and the amount of turning are set based on the tire parameter estimated by tire parameter estimation means, the vehicle can stabilize the vehicle behavior while traveling along the travel route even if the road surface condition changes. Owing to the suppression of the sliding slip, even when the travel route is changed suddenly due to an obstacle while the vehicle is traveling along the travel route, the vehicle can stabilize the vehicle behavior while traveling. Also, owing to the suppression of the sliding slip, even when the vehicle speed is higher than the target vehicle speed while the vehicle is traveling along the travel route, the vehicle can stabilize the vehicle behavior while traveling.

In the above aspect, preferably, the travel route, the amount of acceleration and deceleration, and the amount of turning are set so as to minimize an evaluation function which is a total of a value obtained by multiplying a risk potential based on a distance between the obstacle and the vehicle by a first coefficient, a value obtained by multiplying a slip loss of the tire by a second coefficient, and a value obtained by multiplying an amount of decrease of kinetic energy of the vehicle by a third coefficient.

According to this aspect, the travel control system can set a travel route which can widen the spacing between the vehicle and the obstacle and along which the vehicle can travel with stable vehicle behavior and with a small deceleration.

In the above aspect, preferably, the method comprises: setting a target slip ratio of the tire and a target steering angle when the evaluation function is minimized and calculating a required driving force of the tire based on the target slip ratio; and controlling a steering device such that an actual steering angle of the tire corresponds to the target steering angle and controlling at least one of a drive source and a braking device such that an actual driving force of the tire corresponds to the required driving force.

According to this aspect, since the drive source and the braking device are controlled based on the required driving force of the tire, the control error can be reduced.

According to the foregoing configuration, it is possible to provide a vehicle control system and a vehicle control method which can make the vehicle travel automatically with stable vehicle behavior.

DETAILED DESCRIPTION OF THE INVENTION

Figure 1:
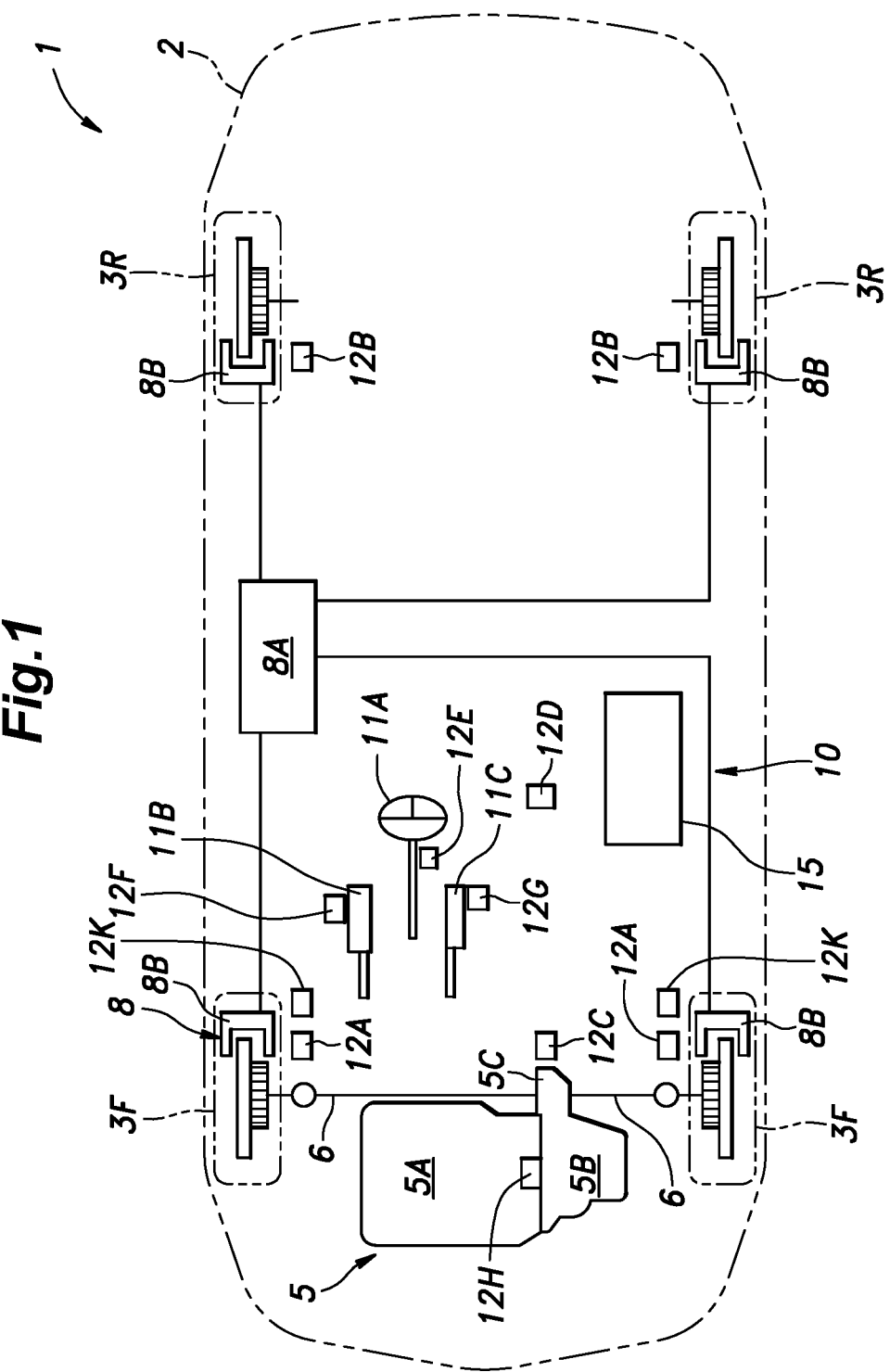
FIG. 1 is a configuration diagram of a vehicle in which a travel control system according to an embodiment of the present invention is installed.
Figure 2:
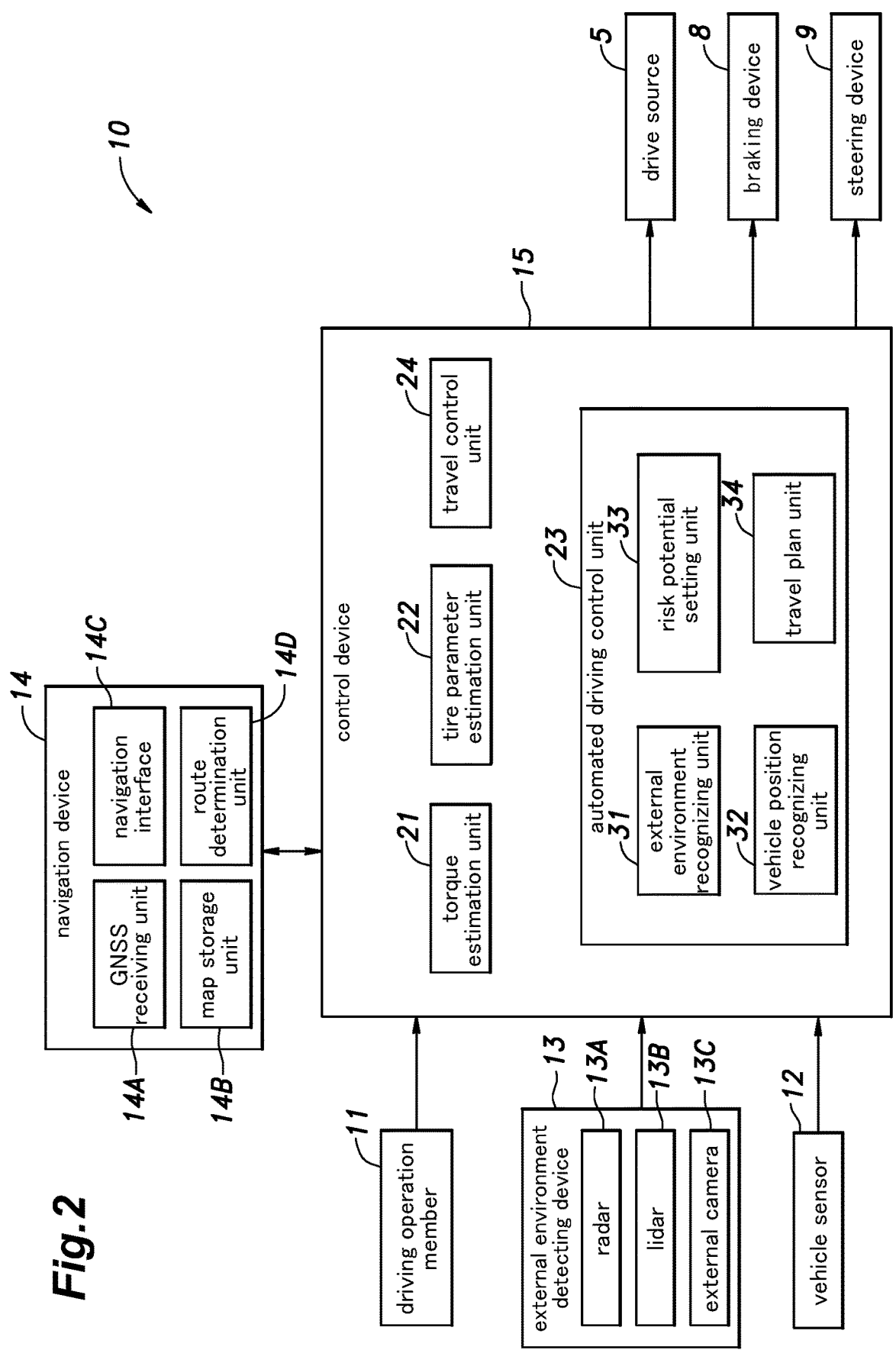
FIG. 2 is a configuration diagram of the travel control system.

In the following, a travel control system and a vehicle control method according to an embodiment of the present invention will be described with reference to the drawings. As shown in FIGS. 1 and 2, a vehicle 1 is a four-wheeled automobile and has a vehicle body 2 and four wheels 3 provided on the vehicle body 2. The wheels 3 include two front wheels 3F which are driving wheels and two rear wheels 3R which are non-driving wheels. Each wheel 3 has a wheel body W and a tire T mounted on the wheel body W.

The vehicle 1 has a drive source 5 for driving the front wheels 3F. The drive source 5 may be an internal combustion engine or an electric motor. The drive source 5 may include a reducer and a differential device. In the present embodiment, the drive source 5 is configured by an internal combustion engine 5A, a reducer 5B, and a differential device 5C (DN). The differential device 5C of the drive source 5 is connected to each front wheel 3F via a power transmission member 6. The power transmission member 6 may be a drive shaft.

The vehicle 1 has braking devices 8 for braking the respective wheels 3. Each braking device 8 includes a hydraulic pressure supply device 8A and a disc brake 8B provided in the wheel body W of each wheel 3 to be actuated by the hydraulic pressure from the hydraulic pressure supply device 8A.

The vehicle 1 includes a steering device 9 for steering the front wheels 3F. For example, the steering device 9 is a rack-and-pinion type steering device that includes a rack connected to the left and right front wheels 3F via respective tie rods, a pinion engaging with the rack, and a steering motor for rotating the pinion.

The vehicle 1 has a travel control system 10 that controls the drive source 5 and the braking devices 8. The travel control system 10 includes a control device 15 that controls the drive source 5, the braking devices 8, and the steering device 9 based on the signals from a driving operation member 11, a vehicle sensor 12, an external environment detecting device 13, and a navigation device 14.

The driving operation element 11 includes a steering wheel 11A for receiving a steering operation of the driver, an accelerator pedal 11B for receiving an acceleration operation of the driver, and a brake pedal 11C for receiving a deceleration operation of the driver.

The vehicle sensor 12 includes left and right front wheel speed sensors 12A (first rotation sensor) that detect the rotation speeds of the left and right front wheels 3F, respectively, left and right rear wheel speed sensors 12B (non-driving wheel rotation sensor) that detect the rotation speeds of the left and right rear wheels 3R, respectively, a drive source rotation speed sensor 12C (second rotation sensor) that detects the rotation speed of an output end of the drive source 5, and an acceleration sensor 12D that detects the forward-backward acceleration and the lateral acceleration of the vehicle body 2. The front wheel speed sensors 12A and the rear wheel speed sensors 12B each detect the rotation speed of the corresponding wheel body W. The left and right rear wheel speed sensors 12B and the acceleration sensor 12D function as a vehicle body speed acquisition unit that acquires information related to the vehicle body speed.

The drive source rotation speed sensor 12C detects the rotation speed of the final gear of the differential device of the drive source 5. The vehicle sensor 12 further includes a steering angle sensor 12E that detects the steering angle of the steering wheel 11A, an accelerator pedal sensor 12F that detects the operation amount of the accelerator pedal 11B, a brake pedal sensor 12G that detects the operation amount of the brake pedal 11C, and an engine rotation speed sensor 12H that detects the rotation speed of the internal combustion engine 5A. Also, the vehicle sensor 12 includes a vertical acceleration sensor 12K that detects the vertical acceleration of the vehicle body 2. The vertical acceleration sensor 12K is preferably provided for each wheel 3. The vertical acceleration sensor 12K may be provided on a suspension arm (not shown in the drawings) supporting each wheel 3. The acceleration sensor 12D and the vertical acceleration sensor 12K may be configured as a common 3-axis or 6-axis acceleration sensor. The output torque of the internal combustion engine 5A is estimated by the control device 15, as described later.

The external environment detecting device 13 is a device for detecting objects outside the vehicle and the like. The external environment detecting device 13 includes sensors for detecting electromagnetic waves such as visible light from the surroundings of the vehicle 1 to detect objects outside the vehicle 1 and the like. Such sensors may include, for example, one or more radars 13A, one or more lidars 13B, and one or more external cameras 13C. Besides, the external environment detecting device 13 may include a device configured to receive signals from outside the vehicle 1 and to detect objects outside the vehicle 1 based on the received signals. The external environment detecting device 13 outputs a detection result to the control device 15.

Each radar 13A emits radio waves such as millimeter waves to the surroundings of the vehicle 1 and captures the radio waves reflected by an object around the vehicle thereby to detect the position (distance and direction) of the object. Each radar 13A may be mounted at any suitable position on the vehicle.

Each lidar 13B emits light such as infrared light to the surroundings of the vehicle 1 and captures the light reflected by an object around the vehicle thereby to detect the position (distance and direction) of the object. Each lidar 13B may be mounted at any suitable position on the vehicle.

The one or more external cameras 13C are arranged to capture images of the surroundings of the vehicle 1 to detect objects around the vehicle 1, for example, nearby vehicles and pedestrians, guardrails, curbs, walls, median strips, and road markings used on the road surface to convey various information such as lane boundaries and road shapes. Each external camera 13C may consist of a digital camera using a solid imaging element such as a CCD or a CMOS, for example.

The navigation device 14 is a device configured to obtain a current position of the vehicle 1 and provides route guidance to a destination and the like. The navigation device 14 includes a GNSS receiving unit 14A, a map storage unit 14B, a navigation interface 14C, and a route determination unit 14D. The GNSS receiving unit 14A identifies the position (latitude and longitude) of the vehicle 1 based on a signal received from an artificial satellite (positioning satellite). The map storage unit 14B consists of a known storage device such as a flash memory or a hard disk, and stores map information. The navigation interface 14C is configured to receive an input, such as the destination, from the occupant and to present various kinds of information to the occupant by display and/or voice. The navigation interface 14C preferably includes, for example, a touch panel display, a speaker, and the like.

The map information contains road information which may include types of roads such as expressways, toll roads, national highways, and prefectural roads, the number of lanes in each road, the center position of each lane (three-dimensional coordinate including a longitude, a latitude, and a height), shapes of the road markings such as road delimiting lines and lane boundaries, presence/absence of sidewalks, curbs, fences and the like, positions of intersections, positions of lane-merging points and lane-branching points, areas of emergency parking zones, and the width of each lane and road signs on the roads. The map information may also contain traffic control information, address information (address, postal code), facility information, telephone number information, and so on.

The route determination unit 14D determines the route to the destination based on the position of the vehicle 1 identified by the GNSS receiving unit 14A, the destination input via the navigation interface 14C, and the map information. Also, when determining the route, the route determination unit 14D preferably determines the target lane, which is a lane to be traveled by the vehicle 1, by referring to the positions of the lane-merging points and the lane-branching points contained in the map information.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 performs automated driving control (hereinafter referred to as automated driving) of at least level 0 to level 3 by combining the various types of vehicle control. The levels are according to the definition from SAE J3016, and are defined depending on the driver's degree of intervention to the driving operation and the vehicle surroundings monitoring.

As shown in FIG. 2, the control device 15 includes a torque estimation unit 21, a tire parameter estimation unit 22, an automated driving control unit 23, and a travel control unit 24 (travel control means). The automated driving control unit 23 includes an external environment recognizing unit 31 (external environment recognizing means), a vehicle position recognizing unit 32, a risk potential setting unit 33, and a travel plan unit 34 (travel plan means).

The torque estimation unit 21 acquires the output torque of the internal combustion engine 5A. The torque estimation unit 21 preferably estimates the output torque of the internal combustion engine 5A based on an intake air volume and a negative pressure in the intake manifold, for example. Also, when the drive source 5 is an electric motor, the output torque of the electric motor is preferably estimated based on the phase current supplied to the electric motor. Note that in another embodiment, a torque sensor for detecting the output torque may be provided on the internal combustion engine 5A or the electric motor. Also, the torque estimation unit 21 estimates the braking torque applied to the wheel body W based on the amount of control of the braking device 8 by the control unit 15.

The tire parameter estimation unit 22 estimates a tire torsional stiffness, which is the torsional stiffness of the tire T, and a road surface friction coefficient, which represents the friction characteristics between the tire T and the road surface, based on at least the rotation speed of the drive source 5, the rotation speed of the wheel body W, the vehicle body speed, and the torque of the wheel body W. Also, the tire parameter estimation unit 22 estimates an adhesion limit driving force and an adhesion limit slip ratio corresponding to the adhesion limit of the tire based on the tire torsional stiffness and the road surface friction coefficient.

In the following, an estimation method of the tire torsional stiffness, the road surface friction coefficient, the adhesion limit driving force, and the adhesion limit slip ratio by the tire parameter estimation unit 22 will be described. The tire parameter estimation unit 22 performs the estimation by executing a program constructed based on the theory shown below.

Since the wheel body W is made of metal such as aluminum or steel and the stiffness thereof is sufficiently high compared to the tire T which is made of rubber. When a driving torque is applied to the wheel body W, elastic deformation occurs in a side wall portion and a tread portion of the tire T. Therefore, it is assumed here that the wheel body W and the tread surface of the tire T are represented by rigid body masses with a spring force acting in a direction to suppress the torsion between them. At the contact part between the tire T and the road surface, the tire T deforms due to the mass of the vehicle 1 so that the tire T makes contact (ground contact surface) with the road surface with a certain constant width (ground contact width). A friction force F acts between the tire and the road surface at the ground contact surface, and this friction force F is expressed by the following formula.

$$F = \mu N \quad (1)$$

Here, $\mu$ is a road surface friction coefficient, which is a friction coefficient between the tire T and the road surface, and N is a wheel load, which is a ground contact load of the tire T. The road surface friction coefficient $\mu$ changes depending on the air pressure and aging of the tire T, the road surface, the weather, the climate, and so on. The magnitude of the friction force F needs to match the magnitude of the driving force, which is a force for making the vehicle 1 travel (acceleration, deceleration, or constant speed travel) against the travel resistance.

At the moment when the driving torque is applied to the wheel body W, torque is not yet transmitted to the tire T and the tire T does not roll yet. At this time, the tire T deforms elastically and a torsion angle is generated between the wheel body W and the tire T. In this state, the tire T is in a stationary torsion state in which the torsion angle is generated in proportion to the driving torque of the wheel body W. Upon generation of the torsion angle, torque is transmitted to the tire T as a reaction force thereof, and the tire T starts rolling. As the tire T rolls, one element of the tire T that was generating the elastic deformation leaves from the ground contact surface and the elastic strain is released. At this time, the reaction force for transmitting the driving torque of the wheel body W becomes insufficient by the magnitude corresponding to the released elastic strain, and thus, the rolling of the tire T is going to stop temporarily. However, in place of the one element of the tire T that has left the ground contact surface, a new element of the tire T comes into contact with the road surface and produces an elastic strain so that the lost reaction force is recovered and the tire T rolls again. A case like this where the boundary condition regarding the individual elements is not unique to each element and moves along the motion of the element is particularly called a moving boundary. When the actual tire T rolls continuously, the above phenomenon occurs in succession, and therefore, the rolling angle of the tire T decreases at a constant rate relative to the rotation angle of the wheel body W. Since the rotation angle of the wheel body W per unit time is proportional to the rotation speed (rotation angular speed), the rolling angle of the tire T per unit time also relatively decreases in proportion to the rotation speed of the wheel body W, and a constant rotation transmission loss occurs. This phenomenon is called elastic slip because an apparent slip is generated between the wheel body W and the road surface due to elastic deformation. Since an amount of elastic slip is created at a constant rate relative to the rotation speed of the wheel body W, a ratio $S_r$ between the rotation speed loss $\Delta\omega$ due to the slip and the rotation speed $\omega_{wheel}$ of the wheel body W is regarded as a slip speed ratio.

$$S_r = \Delta\omega/\omega_{wheel} \quad (2)$$

Figure 3:
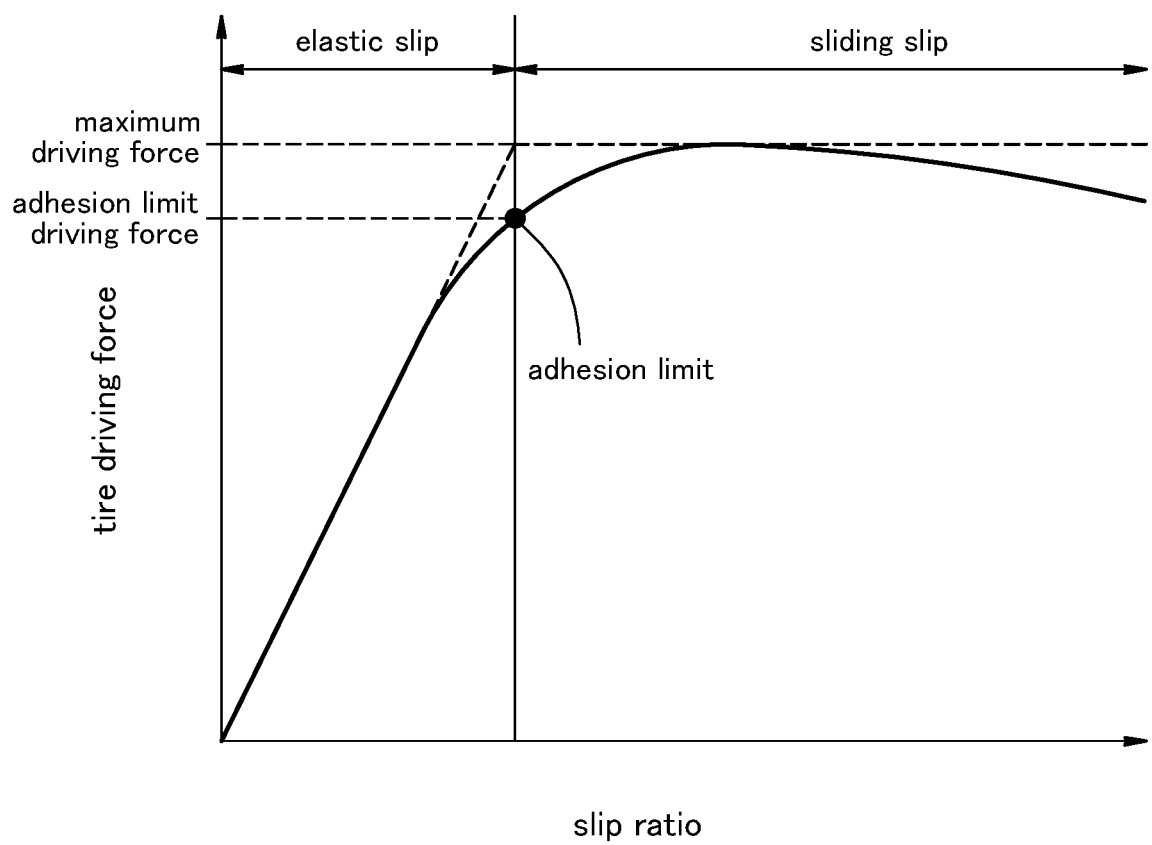
FIG. 3 is a graph showing a relationship between a slip ratio and a tire driving force.

The characteristics of the elastic slip of the tire T are illustrated in FIG. 3. Because there is a limit to the friction force between the tire T and the road surface, as the driving torque of the wheel body W increases, the ground contact surface of the tire T and the road surface start slipping. This is called sliding slip to distinguish from the elastic slip. Thus, as the driving torque of the wheel body W increases, the elastic slip state shifts to the sliding slip state. The boundary between the elastic slip state and the sliding slip state is called an elastic slip limit or an adhesion limit, and the driving force (torque) corresponding to the adhesion limit is called an adhesion limit driving force (torque).

In the elastic slip state, when a torsion angle $\varphi_E$ has occurred between the wheel body W and the tire T due to elastic deformation and the ground contact surface has moved by the ground contact length, a strain energy ($k_T \times$ $\varphi_E^2/2$) due to the elastic deformation is stored in the ground contact surface before rolling, and the strain energy is released by the rolling. This strain energy does no work in relation to the travel of the vehicle 1, and therefore, it can be considered that in this state, the driving energy from the wheel body W is dissipated by the cycle of buildup and release of strain. With the understanding that such energy dissipation occurs due to the apparent slip (elastic slip), the following formula can be obtained using the friction force F acting on the ground contact surface.

$$k_T \phi_E^2/2 = FR\phi_E = T_f \phi_E \quad (3)$$

Namely, the energy dissipation can be substituted by the virtual work calculated from the friction force and the apparent slip as shown in the formula 3, where $k_T$ is a torsional stiffness [Nm/rad] of the tire T, R is a dynamic radius [m] of the tire T, and $T_f$ is a friction torque [Nm] produced at the ground contact surface. Provided that when the tire T rolls in accordance with the torsion angle $\varphi_E$, the rotation angle of the wheel body W including the torsion angle $\varphi_E$ is $\varphi_{wheel}$, the slip speed ratio $S_r$ is represented by the following formula 4 based on the geometric relationship.

$$S_r = \phi_E/\phi_{wheel} \quad (4)$$

From the formula 2 and the formula 4, $\varphi_E$ is represented by the following formula 5.

$$\phi_E = (\phi_{wheel}/\omega_{wheel})\Delta\omega \quad (5)$$

By putting this into the formula 3, the following formula 6 is derived.

$$T_f(k_T\phi_{wheel}/2\omega_{wheel})\Delta\omega = c_T\Delta\omega \quad (6)$$

As expressed in the formula 6, the friction torque $T_f$ is represented by a viscous resistance force that is proportional to the slip (rotation speed loss) $\Delta\omega$ occurring between the wheel body W and the road surface. Here, $c_T$ is a friction damping coefficient [Nm/(rad/s)] between the tire and the road surface, corresponds to a viscosity coefficient, and is proportional to the tire torsional stiffness $k_T$.

Figure 4:
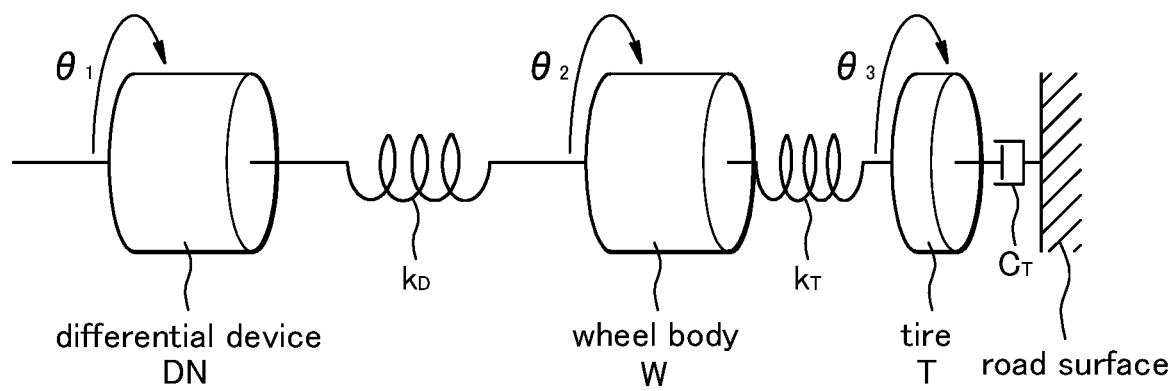
FIG. 4 is an explanatory diagram showing a dynamic model of a driving wheel.

A dynamic model from the drive source 5 to the contact surface can be represented as illustrated in FIG. 4. Based on this model, the state equation is represented by the formula 7 below. The formula 7 is derived for one of the left and right front wheels 3F of the vehicle 1 constituted as an FF vehicle which has the internal combustion engine installed in the front portion thereof to drive the front wheels 3F via the transmission.

$$\left. \begin{array}{l} I_w \ddot{\theta}_w = k_D(\theta_{DN} - \theta_w) - k_T(\theta_w - \theta_T) \\ I_T \ddot{\theta} = k_T(\theta_w - \theta_T) - c_T \dot{\theta}_T \end{array} \right\} \quad (7)$$

Here, $\theta_{DN}$ is a rotation angle perturbation [rad] of the final gear of the differential device DN (the output shaft of the drive source 5), $\theta_W$ is a rotation angle perturbation [rad] of the wheel body, $\theta_T$ is a rotation angle perturbation [rad] of the tire, $I_w$, is a moment of inertia [kgm²] of the wheel body, $I_T$ is a moment of inertia [kgm²] of the tire, and $k_D$ is a torsional stiffness [Nm/rad] of the power transmission member 6 (drive shaft).

By making the formula 7 dimensionless using the following formula 8, the state variable (vector quantity) represented by the formula 9 can be represented by the formula 10.

$$x_1 = \theta_{DN}, x_2 = \theta_w, x_3 = \theta_T \quad (8)$$

$$\omega_1 = \sqrt{\frac{k_D}{I_W}}, \omega_2 = \sqrt{\frac{k_T}{I_W}}$$

$$\rho = \sqrt{\frac{I_W}{I_T}}, \zeta_2 = \frac{c_T}{\sqrt{I_W k_T}}$$

$$x = {}^t(x_2\ \dot{x}_2\ x_3\ \dot{x}_3) \quad (9)$$

$$\dot{x} = Ax \quad (10)$$

$$A = \begin{pmatrix} 0 & 1 & 0 & 0 \\ -\omega_1^2 - \omega_2^2 & 0 & \omega_2^2 & 0 \\ 0 & 0 & 0 & 1 \\ \rho^2\omega_2^2 & 0 & -\rho^2\omega_2^2 & -\rho^2\omega_2\zeta_2 \end{pmatrix}$$

Figure 5A:
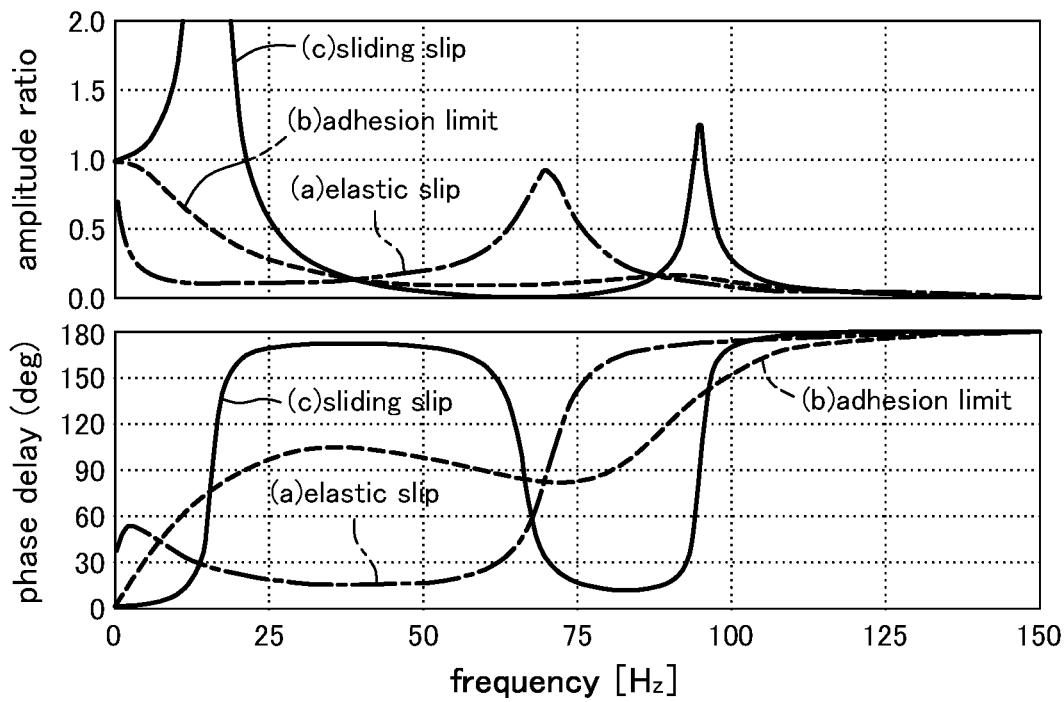
FIG. 5A is a graph showing the characteristics of the rotation fluctuation transmission between a differential device and the driving wheel.

The frequency response of the rotation fluctuation of the wheel body W to the rotation fluctuation of the differential device DN obtained from the formula 10 can be illustrated as in FIG. 5A. FIG. 5A shows, with respect to the frequency, an amplification ratio (amplitude ratio m) of the rotation fluctuation amplitude of the wheel body W to the rotation fluctuation amplitude of the differential device DN and a phase delay (phase delay $\Psi 1$) of the rotation fluctuation of the wheel body W relative to the rotation fluctuation of the differential device DN.

From the formula 6, the slip state approaches the sliding slip state as the value of the friction damping coefficient $c_T$ decreases. In FIG. 5A, (a) represents the response in the elastic slip state, and (c) represents the response in the sliding slip state. Also, (b) indicates the boundary (adhesion limit) between the two slip states. When the graphs (a) and (c) indicating the amplitude ratios in FIG. 5A are compared with each other, it can be seen that when the sliding slip state is entered, a new peak appears on the low frequency side and the peak on the high frequency side moves toward a higher frequency side. The vibration mode corresponding to the peak on the high frequency side will be referred to as an elastic slip mode, and the vibration mode corresponding to the peak on the low frequency side will be referred to as a sliding slip mode.

Figure 5B:
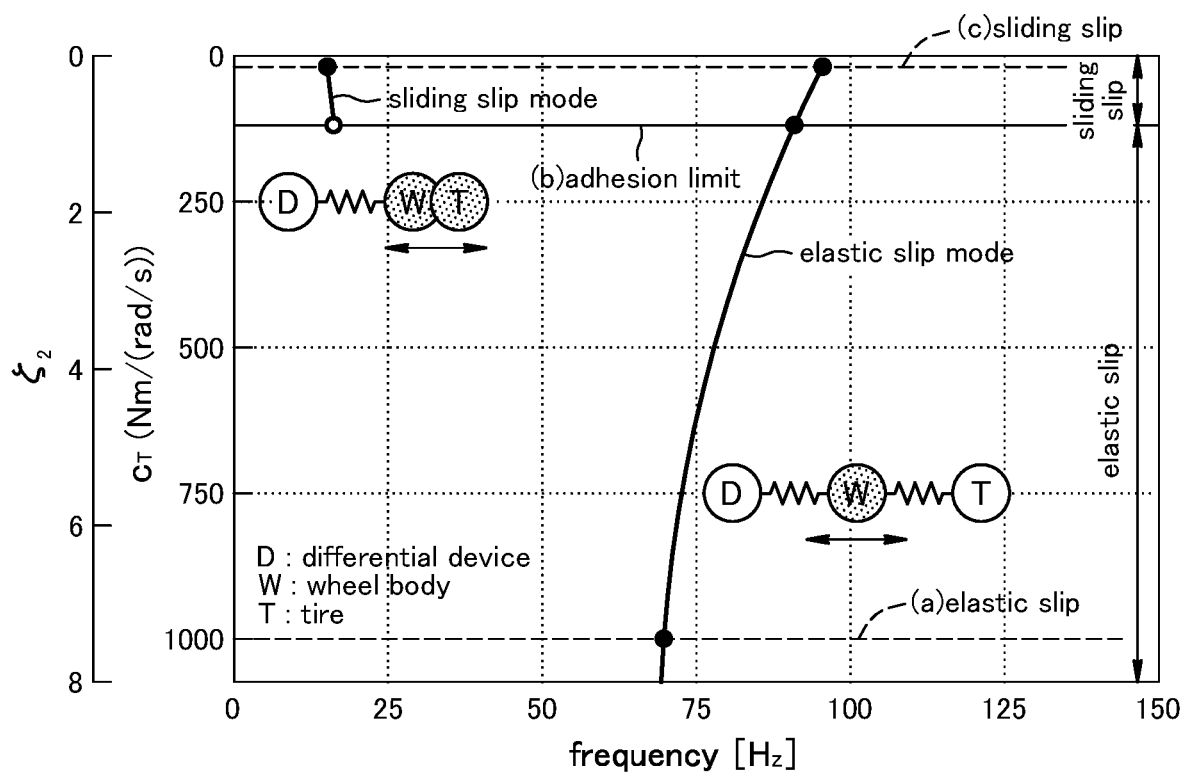
FIG. 5B is an explanatory diagram showing a relationship between the frequency and vibration modes.

Existence ranges of the elastic slip mode and the sliding slip mode with respect to the frequency and the friction damping coefficient $c_T$ are illustrated in FIG. 5B. In FIG. 5B, the existence ranges of the elastic slip mode and the sliding slip mode are shown by solid lines.

In the elastic slip mode, since the driving force is transmitted to the road surface due to the elastic deformation of the tire T, the elastic force produced by the tire torsional stiffness $k_T$ acts on the wheel body W as a reaction force. Therefore, the wheel body W receives a combination of the elastic forces produced by the drive shaft stiffness $k_D$ and the tire torsional stiffness $k_T$ so that the wheel body W vibrates. The elastic slip mode is seen on the high frequency side in FIGS. 5A and 5B. As shown in FIG. 5B, the elastic slip mode shifts toward a higher frequency side as the friction damping coefficient $c_T$ decreases, namely, as the slip state approaches the sliding slip state from the elastic slip state. This corresponds to the phenomenon that in the graph showing the amplitude ratios in FIG. 5A, the peak on the high frequency side is moved toward a higher frequency side when the state has transitioned to the sliding slip state.

In the sliding slip mode, since the tire T and the road surface dynamically slip, the elastic force produced due to the tire torsional stiffness $k_T$ is released by the slip and the reaction force acting on the wheel body W also disappears.

Therefore, the wheel body W and the tire T become unitary and receive only the elastic force produced due to the drive shaft stiffness $k_D$ so that they vibrate in the same phase. The sliding slip mode is seen on the low frequency side in FIGS. 5A and 5B. As shown in FIG. 5B, the sliding slip mode appears when the friction damping coefficient $c_T$ becomes less than the constant value, namely, namely when the slip state becomes the sliding slip state, and does not appear in the elastic slip state. This corresponds to the phenomenon that in the graph showing the amplitude ratio in FIG. 5A, a new peak appears on the low frequency side when the slip state becomes the sliding slip state.

As described above, as the slip state transitions from the elastic slip state to the sliding slip state, the sliding slip mode emerges. Therefore, it appears to be possible to determination the adhesion limit by monitoring the emergence of the sliding slip mode. However, as seen by the amplitude ratio in FIG. 5A, a peak on the low frequency side cannot be confirmed yet at the adhesion limit. When a peak on the low frequency side is clearly confirmed as in the road surface determination device described in JP2018-155696A, only a state in which the sliding slip has already progressed can be determined (in JP2018-155696A, since the vibration observation position is different, it appears that the mode disappears along with the sliding slip, but they are the same as phenomena). Namely, only by simply observing the vibration waveform, it is not possible to strictly determine the emergence of the sliding slip mode. In the first place, it is not possible to predict the adhesion limit from the elastic slip state. Therefore, an attention is focused on a dimensionless quantity $\zeta_2$ representing the damping state of the system. As shown in the formula 8, the dimensionless quantity $\zeta_2$ is a quantity made dimensionless by the friction damping coefficient $c_T$ and the tire torsional stiffness $k_T$ and uniquely representing the damping state of the system regardless of changes of various factors. If the current dimensionless quantity $\zeta_2$ can be estimated, by comparing it with a threshold value corresponding to the adhesion limit, occurrence of the sliding slip can be strictly determined. Also, since the deviation between the dimensionless quantity $\zeta_2$ and the aforementioned threshold value can be used as a basis for determining the margin till the sliding slip occurs, it is useful to know the dimensionless quantity $\zeta_2$. In the following, first, an acquisition method of the dimensionless quantity $\zeta_2$ will be described.

A torque fluctuation generally occurs in the internal combustion engine serving as the drive source 5 of the vehicle 1, and this torque fluctuation is also transmitted to the tire from the differential device DN. As a cause of the torque fluctuation, there is a fluctuation of the cylinder internal pressure in the case of the internal combustion engine, and a cogging torque attributed to the number of poles in the case of the electric motor. In the differential device DN, a rotation fluctuation attributed to the input torque fluctuation occurs simultaneously. Here, the rotation fluctuation of the differential device DN is expressed by the following formula 11.

$$\dot{x}_1 = A_1 \sin \Omega t \quad (11)$$

The formula 11 can be considered a forced excitation under the boundary condition. $A_1$ is a rotation fluctuation amplitude [m] of the differential device DN, $\Omega$ is an angular frequency [rad/s] of the excitation force (torque fluctuation of the internal combustion engine E), and t is time [s]. In such a forced excitation state, the state equation indicated by the formula 10 becomes as follows.

$$\dot{x} = Ax + B \quad (12)$$

$$A = \begin{pmatrix} 0 & 1 & 0 & 0 \\ -\omega_1^2 - \omega_2^2 & 0 & \omega_2^2 & 0 \\ 0 & 0 & 0 & 1 \\ \rho^2 \omega_2^2 & 0 & -\rho^2 \omega_2^2 & -\rho^2 \omega_2 \zeta_2 \end{pmatrix}, B = \begin{pmatrix} 0 \\ -\dfrac{\omega_1^2}{\Omega} A_1 \cos \Omega t \\ 0 \\ 0 \end{pmatrix}$$

In the formula 12, B represents an external force (excitation input), and the natural vibration mode (hereinafter referred to as a natural mode) that the original system has is determined by a Jacobian matrix A. The parameters deciding the Jacobian matrix A are $\rho$, $\omega_1$, $\omega_2$, and $\zeta_2$, of which $\rho$ and $\omega_1$ are design specifications (known values). Therefore, once the dimensionless quantity $\omega_2$ and the dimensionless quantity $\zeta_2$ corresponding to the slip identification quantity are known, the natural mode can be known. In the formula 7, there are two dominant equations while there are two dimensionless quantities that are unknown (namely, $\omega_2$ and $\zeta_2$), and therefore, $\omega_2$, $\zeta_2$ should be able to be decided uniquely. Note that because the dimensionless quantity $\omega_2$ is obtained from the tire torsional stiffness $k_T$ and the dimensionless quantity $\zeta_2$ is obtained from the friction damping coefficient $c_T$ and the tire torsional stiffness $k_T$, that the dimensionless quantities $\omega_2$, $\zeta_2$ can be decided is equivalent to that the friction damping coefficient $c_T$ and the tire torsional stiffness $k_T$ can be decided.

Assume that the periodic solutions of the formula 12 are represented as follows.

$$\begin{aligned} \dot{x}_1' &= A_1 \sin(\tau + \Psi_1) \\ \dot{x}_2 &= A_2 \sin \tau \\ \dot{x}_3 &= A_3 \sin(\tau - \Psi_3) \\ \tau &= \Omega t \end{aligned} \quad (13)$$

By putting the periodic solutions of the formula 13 into the formula 12 and performing coefficient decision based on the Galerkin method, the following relational expression is obtained.

$$\left. \begin{aligned} \dfrac{\rho^4 \zeta_2 \left(\dfrac{\omega_2}{\omega_1}\right)^2 \left(\dfrac{\Omega}{\omega_2}\right)}{\left(\dfrac{\Omega}{\omega_2}\right)^4 + \rho^2 (\rho^2 \zeta_2^2 - 2)\left(\dfrac{\Omega}{\omega_2}\right)^2 + \rho^4} &= \dfrac{\sin \Psi_1}{m} \\ \dfrac{1 + \left(\dfrac{\omega_2}{\omega_1}\right)^2 \left\{1 - \left(\dfrac{\Omega}{\omega_2}\right)^2\right\} +}{} & \\ \dfrac{\rho^2 \left(\dfrac{\omega_2}{\omega_1}\right)^2 \left\{\left(\dfrac{\Omega}{\omega_2}\right)^2 - \rho^2\right\}}{\left(\dfrac{\Omega}{\omega_2}\right)^4 + \rho^2 (\rho^2 \zeta_2^2 - 2)\left(\dfrac{\Omega}{\omega_2}\right)^2 + \rho^4} &= \dfrac{\cos \Psi_1}{m} \\ m &= \dfrac{A_2}{A_1} \end{aligned} \right\} \quad (14)$$

Here, m is an amplification ratio (amplitude ratio) of the rotation fluctuation amplitude of the wheel body to the rotation fluctuation amplitude of the differential device DN, and $\Psi_1$ is a phase delay of the rotation fluctuation of the wheel body relative to the rotation fluctuation of the differential device DN. Thus, by measuring the rotation fluctuation of the differential device DN and the rotation fluctuation of the wheel body, it is possible to obtain the dimensionless quantities $\omega_2$, $\zeta_2$ from the formula 14.

Figure 6:
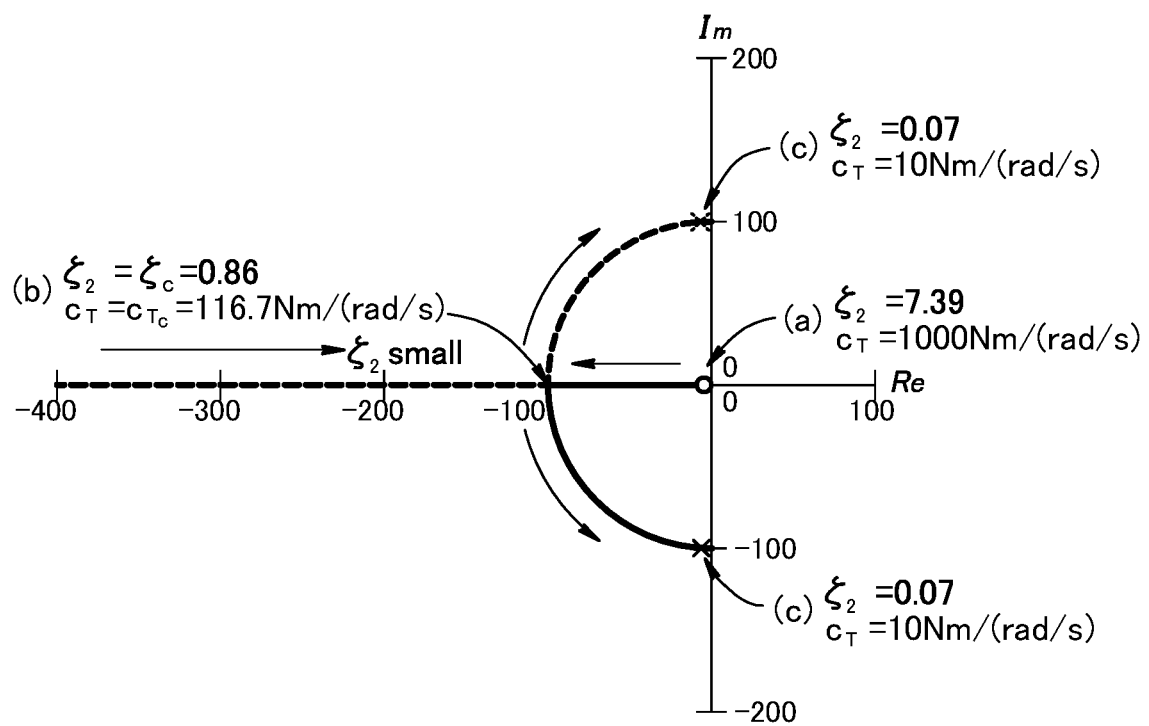
FIG. 6 is a diagram showing a root locus in an elastic slip mode and a sliding slip mode.

Next, provided that the current dimensionless quantities $\omega_2$, $\zeta_2$ have been obtained from the formula 14, a method of acquiring the relationship between the dimensionless quantity $\zeta_2$ and the natural mode will be described. The dimensionless quantity $\omega_2$ reflects the change of the tire torsional stiffness $k_T$ but since there is not a significant change under the same condition, description will be made of the relationship between the dimensionless quantity $\zeta_2$ and the natural mode with an assumption that the tire torsional stiffness $k_T$ is constant. Accordingly, the dimensionless quantity $\zeta_2$ uniquely corresponds to the friction damping coefficient $c_T$. The behavior of the natural mode can be described by obtaining the eigenvalue $\lambda$ of the Jacobian matrix A. FIG. 6 shows the behavior of the eigenvalue $\lambda$ (root locus) corresponding to the above-described sliding slip mode. (a) to (b) of FIG. 6 correspond to (a) to (c) of FIG. 5A. Note that if the tire torsional stiffness $k_T$ changes, the frequency of the vibration mode changes, and accordingly, the scale of the root locus of FIG. 6 changes but there is no change in the main properties described below. Also, in such a case, the dimensionless quantity $\omega_2$ in the current situation, and hence the tire torsional stiffness $k_T$ has been known, there is no control problem.

In FIG. 6, the horizontal axis represents a real axis, the vertical axis represents an imaginary axis, and an imaginal part represents a vibration solution. In the elastic slip state (see (a) of FIG. 6), a pair of roots are on the real axis, indicating that there is no vibration solution. Namely, no vibration corresponding to the sliding slip mode is generated. On the other hand, when the slip state becomes the sliding slip state (see (c) of FIG. 6), the root has an imaginal part, indicating that a vibration is produced. Namely, it can be appreciated that when the dimensionless quantity $\zeta_2$ becomes less than $\zeta_C$ (see (b) and (c) of FIG. 6), the sliding slip mode emerges. Thus, based on the value of the dimensionless quantity $\zeta_C$, the slip state can be determined as follows:

when the dimensionless quantity $\zeta_2 > \zeta_C$, the slip state is the elastic slip state;
when the dimensionless quantity $\zeta_2 = \zeta_C$, the slip state is the adhesion limit; and
when the dimensionless quantity $\zeta_2 < \zeta_C$, the slip state is the sliding slip state, where $\zeta_C$ is a value that varies depending on the design specifications. In FIG. 6, numerical values of $\zeta_2$ and the friction damping coefficient $c_T$ are exemplarily shown in the case where $\zeta_C$ is 0.86. Once the dimensionless quantity $\zeta_C$ is known, the friction damping coefficient $c_{Tc}$ when the slip state becomes the elastic slip limit can be acquired from the formula 8.

However, to estimate the dimensionless quantities $\omega_2$, $\zeta_2$ based on the foregoing theory, a specific vibration is necessary (for example, the torque fluctuation of the internal combustion engine serving as the drive source 5). Namely, there is a problem that when the vibration is not generated or is very small compared to the sensor noise, the tire slip cannot be determined. Therefore, an attention is focused on that the natural mode that the original system has is determined by the Jacobian matrix A as described above. Namely, by identifying the dynamic model from the drive source 5 to the contact surface between the tire T and the road surface shown in FIG. 4 and evaluating the Jacobian matrix A for the identified model, it is possible to estimate the dimensionless quantities $\omega_2$, $\zeta_2$ (the friction damping coefficient $c_T$ and the tire torsional stiffness $k_T$) even when the vibration is not generated.

In the following, a method by which the tire parameter estimation unit 22 identifies the dynamic model and the tire model shown in FIG. 4 will be described. In this model identification, mainly the tire torsional stiffness $k_T$ and the road surface friction coefficient $\lambda_{\mu x}$ are estimated as model parameters. The tire parameter estimation unit 22 preferably estimates the tire torsional stiffness $k_T$ and the road surface friction coefficient $\lambda_{\mu x}$ by using a known Kalman filter or observer, for example. In the present embodiment, an example of the estimation method using a Kalman filter will be described. The state equation based on the dynamic model from the drive source 5 to the contact surface shown in FIG. 4 can be expressed by the below formula 15. In the following, description will be exemplarily made of the left front wheel 3 of the vehicle 1 constituted as an FF vehicle in which the internal combustion engine is installed in the front portion of the vehicle 1 to drive the front wheels 3F via the transmission. Estimation can be similarly performed with regard to the other wheels 3 by properly changing or adjusting the torsional stiffness $k_D$ of the power transmission member 6 (drive shaft), the load movement formula, etc.

$$\frac{d}{dt}\begin{bmatrix}\theta_{DN}\\\dot{\theta}_{DN}\\\theta_W\\\dot{\theta}_W\\\theta_T\\\dot{\theta}_T\\k_T\\\lambda_{\mu x}\\F_{zfl}\\a_{DN}\\\varphi\\V_x\end{bmatrix} = \begin{bmatrix}\dot{\theta}_{DN}\\\frac{1}{I_{DN}}[a_{DN}\sin\varphi - k_D(\theta_{DN}-\theta_W)]\\\dot{\theta}_W\\\frac{1}{I_W}[k_D(\theta_{DN}-\theta_W) - k_T(\theta_W-\theta_T)]\\\dot{\theta}_T\\\frac{1}{I_T}\left[k_T(\theta_W-\theta_T) - R_e(F_{zfl})\cdot F_x(k_T, \lambda_{\mu x}, F_{zfl}, \dot{\theta}_W, V_{cxfl}, \hat{\alpha}_f, Y_{fl})\right]\\0\\0\\-\frac{k_f}{(k_f+k_r)}\frac{h}{d_f}m\dot{a}_y - \frac{h}{2l}m\dot{a}_x\\0\\0\\a_x^*\end{bmatrix} + \begin{bmatrix}0\\\frac{T_{DNo}}{I_{DN}}\\0\\-\frac{T_{brk}}{I_W}\\0\\0\\0\\0\\0\\0\\\frac{\pi N_e}{30}\cdot v\\0\\0\end{bmatrix} \quad (15)$$

Here, $\theta_{DN}$ is a rotation angle perturbation [rad] of the final gear of the differential device DN (the output shaft of the drive source 5), $\theta_W$ is a rotation angle perturbation [rad] of the wheel body, $\theta_T$ is a rotation angle perturbation [rad] of the tire, $k_T$ is a torsional stiffness [Nm/rad] of the tire, $\lambda_{\mu x}$ is a road surface friction coefficient [-] in the fore and aft direction (friction coefficient between the tire and the road surface), Fz is a wheel load [N], $a_{DN}$ is a torque fluctuation amplitude [Nm], φ is a phase [rad] of the torque fluctuation, $V_x$ is a fore-and-aft ground speed [m/s] of the center of gravity of the vehicle, $I_{DN}$ is a moment of inertia [kgm²] of the final gear of the differential device DN (the output shaft of the drive source 5), $k_D$ is a torsional stiffness [Nm/rad] of the power transmission member 6 (drive shaft), $I_w$ is a moment of inertia [kgm²] of the wheel body, $I_T$ is a moment of inertia [kgm²] of the tire, $R_e$ is a tire dynamic radius [m], $F_x$ is a driving force [N], $V_{cxfl}$ is a ground speed [m/s] in the longitudinal direction of the wheel 3 (the left front wheel), $\alpha\hat{}_f$ (^ represents a hat operator) is a tire side slip angle [deg] of the front wheel 3, $\gamma_{fl}$ is a camber angle [deg] of the wheel (the left front wheel), $k_f$ is a front roll stiffness [Nm/rad], $k_r$ is a rear roll stiffness [Nm/rad], h is a height of the center of gravity [m], $d_f$ is a front tread width [m], m is a vehicle weight [kg], $a_y$ is a lateral acceleration [m/s²], $a_x$ is a forward-backward acceleration [m/s²], $T_{DNo}$ is an average torque [Nm] of the final gear of the differential device DN (the output shaft of the drive source 5), $T_{brk}$ is a braking torque [Nm] applied on the wheel body by the braking device 8, $N_e$ is an engine rotation speed [rpm], and ν is a coefficient corresponding to the type of the internal combustion engine and is 2 in the case of an inline 4-cylinder 4-stroke engine. The average torque $T_{DNo}$ of the differential device DN is obtained from the estimated output torque of the drive source 5 and the reduction ratio of the transmission. The estimated output torque of the drive source 5 can be generally estimated from the inflow air volume to or the negative pressure in the intake manifold when the drive source 5 is an internal combustion engine, and from the phase current when the drive source 5 is an electric motor. The braking torque $T_{brk}$ can be generally estimated based on the hydraulic pressure from the hydraulic pressure supply device 8A. Also, the Superscript "^ (hat)" indicates that the value is an estimate. The tire side slip angle $\alpha\hat{}_f$ of the front wheel and the camber angle $\gamma_{fl}$ of the left front wheel can be estimated by a general method based on the signal of the inertial sensor, the suspension geometry, etc.

In general, when the drive source 5 is an internal combustion engine, a torque fluctuation occurs based on the ignition cycle thereof, and therefore, it is necessary to take into account a periodic torque fluctuation as the output torque of the transmission. Thus, a situation in which the torque fluctuation $T_{DN}$ ($a_{DN}·\sin φ+T_{DNo}$) is transmitted to the wheel 3 via the drive shaft is assumed. Since a torque fluctuation for every ignition cycle occurs in the internal combustion engine, the frequency of the torque fluctuation is proportional to the rotation speed of the internal combustion engine. Namely, the angular frequency φ̇* ("•" represents a dot) of the torque fluctuation is expressed by the following formula 16. The superscript dot ("•") is a derivative operator, and φ̇* represents a derivative of the phase angle (namely, an angular frequency). Note that when the drive source 5 is an internal combustion engine, a periodic torque fluctuation is taken into consideration in the model to further improve the estimation accuracy, but even when such a torque fluctuation or specific vibration is not generated, the following Kalman filter functions.

$$\dot{\varphi} = \frac{\pi N_e}{30} \cdot v \quad (16)$$

The wheel load $F_z$ in the formula 15 is a vertical load acting on each of the front left and right wheels 3F and the rear left and right wheels 3R, and can be expressed by the following formula by taking into account the load movement due to the acceleration and deceleration as well as turning of the vehicle 1. The formula 15 describes the left front wheel load $F_{zfl}$ in the formula 17.

$$F_{zfl} = \frac{m_f}{2}g - \frac{k_f}{(k_f+k_r)}\frac{h}{d_f}ma_y - \frac{h}{2l}ma_x \quad (17)$$

$$F_{zfr} = \frac{m_f}{2}g - \frac{k_f}{(k_f+k_r)}\frac{h}{d_f}ma_y - \frac{h}{2l}ma_x$$

$$F_{zrl} = \frac{m_r}{2}g - \frac{k_f}{(k_f+k_r)}\frac{h}{d_r}ma_y - \frac{h}{2l}ma_x$$

$$F_{zrr} = \frac{m_r}{2}g - \frac{k_f}{(k_f+k_r)}\frac{h}{d_r}ma_y - \frac{h}{2l}ma_x$$

$R_e(F_z)$ is a tire dynamic radius and depends on the wheel load $F_z$. Fx is a friction force (driving force) in the longitudinal direction of the tire that occurs between the tire and the road surface. $F_x$ is represented by a function having $k_T$, $\lambda_{\mu x}$, $F_z$, $\theta_W$, $V_{cxfl}$, $\alpha\hat{}$, $\gamma\hat{}$ as its arguments by using a tire model based on the Magic formula (Pacejka) and will be explained in detail below.

If, of the use conditions of the tire, the wheel load and/or the slip between the tire and the road surface change, they will influence the driving force generated in the tire. Based on the following formulas 18 to 21, these influences are implemented in the tire model as correction coefficients.

$$df_z = \frac{F_z - F_{zo}}{F_{zo}} \quad (18)$$

Here, $F_{zo}$ is a standard value [N] of the wheel load assumed for the tire that is used. In this example, the left front wheel load $F_{zfl}$ corresponds to $F_z$.

$$a^* = \tan \alpha \cdot \text{sgn} V_{cx} = -\frac{V_{cy}}{|V_{cx}|} \quad (19)$$

Here, α is a tire side slip angle [deg], $V_{cx}$ is a ground speed in the longitudinal direction of the wheel 3 [m/s], and $V_{cy}$ is a lateral speed [m/s]. In this example, the tire side slip angle (estimated value) $\alpha\hat{}_f$ of the front wheel is put into α. Also, the ground speed $V_{cxfl}$ in the longitudinal direction of the left front wheel which will be described later (formula 38) is put into $V_{cx}$.

$$\gamma^* = \sin \gamma \quad (20)$$

Here, γ is a camber angle [deg] of the wheel 3, and the camber angle (estimated value) $\gamma_{fl}$ of the left front wheel is put into it.

$$\kappa = -\frac{V_{sx}}{|V_{cx}|} = -\frac{V_{cx} - R_e \theta_w}{|V_{cx}|} \quad (21)$$

Here, κ is a slip ratio which is an indicator representing the slip in the driving force direction.

When the vehicle 1 is in a straight travelling state, namely, when the side slip angle is 0 (pure slip), the tire torsional stiffness $k_T$, the road surface friction coefficient $\lambda_{\mu x}$, and the wheel load $F_z$ determine main friction characteristics, and the driving force $F_{xo}$ is expressed by the following formulas.

$$F_{xo} = D_x \sin\{C_x \tan^{-1}[B_x \kappa_x - E_x(B_x \kappa_x - \tan^{-1} B_x \kappa_x)]\} \quad (22)$$

$$\kappa_x = \kappa \quad (23)$$

$$C_x = p_{Cx1}(>0) \quad (24)$$

$$D_x = \mu_x F_z(>0) \quad (25)$$

$$\mu_x = (p_{Dx1} + p_{Dx2} df_z)(1 - p_{Dx3}\gamma^2)\lambda_{\mu x} \quad (26)$$

$$E_x = (p_{Ex1} + p_{Ex2} df_z + p_{Ex3} df_z^2)[1 - p_{Ex4}\operatorname{sgn}(\kappa_x)] \quad (27)$$

$$K_{xk} = \frac{k_T \phi}{2R_e}(=B_x C_x D_x = \partial F_{xo}/\partial \kappa_x \text{ at } \kappa_x = 0)(=C_{F\kappa}) \quad (28)$$

$$B_x = K_{x\kappa}/(C_x D_x \varepsilon_x) \quad (29)$$

Here, $p_{cxl}$, $p_{Dxl}$, $p_{Dx2}$, $p_{Dx3}$, $p_{Ex1}$, $p_{Ex2}$, $p_{Ex3}$, $p_{Ex4}$, and $\varepsilon_x$ are constants. $\varepsilon_x$ is a sufficiently small value that is set to avoid division by 0 and has no physical meaning.

When a side slip angle is generated (combined slip), the side slip angle contributes to friction force saturation, and therefore, the driving force $F_x$ is expressed by the following formulas 30 to 37.

$$F_x = G_{x\alpha} F_{xo} \quad (30)$$

$$G_{x\alpha} = \cos\{C_{x\alpha} \tan^{-1}[B_{x\alpha}(x_S - E_{x\alpha}(B_{x\alpha}\alpha_S - \tan^{-1} B_{x\alpha}\alpha_S)]\}/G_{x\alpha o}(>0) \quad (31)$$

$$G_{x\alpha o} = \cos\{C_{x\alpha} \tan^{-1}[B_{x\alpha} S_{Hx\alpha} - E_{x\alpha}(B_{x\alpha} S_{Hx\alpha} - \tan^{-1} B_{x\alpha} S_{Hx\alpha})]\} \quad (32)$$

$$\alpha_S = \alpha^* + S_{Hx\alpha} \quad (33)$$

$$B_{x\alpha} = (r_{Bx1} + r_{Bx3}\gamma^{*2})\cos(\tan^{-1} r_{Bx2}\kappa) \cdot \lambda_{x\alpha} \quad (34)$$

$$C_{x\alpha} = r_{Cx1} \quad (35)$$

$$E_{x\alpha} = r_{Ex1} + r_{Ex2} df_z \quad (36)$$

$$S_{Hx\alpha} = r_{Hx1} \quad (37)$$

Here, $r_{Bx1}$, $r_{Bx2}$, $r_{Bx3}$, $\lambda_{x\alpha}$, $r_{Cx1}$, $r_{Ex1}$, and $r_{Ex2}$ are constants.

The wheel speed (the rotation speed of the wheel body or the derivative of $\theta_W$) and the ground speed $V_{cxfl}$ in the longitudinal direction of the driving wheel (left front wheel) are variables for obtaining the slip ratio $\kappa$. The ground speed $V_{cxfl}$ in the longitudinal direction of the driving wheel (left front wheel) is obtained by the following formula based on a ground speed $V_x$ of the position of the center of gravity of the vehicle (vehicle body speed) in the fore and aft direction, a front wheel steering angle $\delta_f$ [deg], and a yaw angular velocity $\gamma$ [deg/s].

$$V_{cxfl} = V_x \cos\delta_f + \left(l\sin\delta_f - \frac{d_f}{2}\cos\delta_f\right)\gamma \quad (38)$$

Here, l is a wheel base [m].

The vehicle body speed $V_x$ is obtained as an integral of a forward-backward acceleration $a_x^*$. The forward-backward acceleration $a_x^*$ may be simply made equal to $a_x$, but if a 6-axis inertial sensor or the like can be used, is preferably set to a value after tilt correction (plane projection).

For the state equation of the formula 15, an observation equation is expressed by the following formula.

$$\begin{bmatrix} y_1 \\ y_2 \\ y_3 \\ y_4 \end{bmatrix} = \begin{bmatrix} 30\dot{\theta}_{DN}/\pi \\ 30\dot{\theta}_w/\pi \\ \lambda_\mu \\ 3.6 V_{rr}(V_x) \end{bmatrix} \quad (39)$$

$\lambda_\mu$ is a pseudo observation amount of the road surface friction coefficient, and is used when putting a limit on the estimated value of the road surface friction coefficient such that the estimated value of the road surface friction coefficient is greater than or equal to 0 and less than or equal to 1. $\lambda_\mu$ is preferably set to a value greater than or equal to 0 and less than or equal to 1. Preferably, $\lambda\mu$ is set to 0 in a case where the estimated value of the road surface friction coefficient becomes less than 0, and is set to 1 in a case where the estimated value of the road surface friction coefficient becomes greater than 1, for example. $V_{rr}$ is a wheel speed of the rear wheel which is a non-driving wheel. When it is assumed that the rear wheel is not slipping, the rear wheel speed $V_{rr}$ becomes equal to the vehicle body speed $V_x$. The observed value is represented by the following formula 40 based on the wheel speed $V_{Wrl}$ of the left rear wheel and the wheel speed $V_{Wrr}$ of the right rear wheel.

$$y_4 = \frac{V_{Wrl} + V_{Wrr}}{2} \quad (40)$$

The formula 15 is a state equation for the continuous time representation, and the tire parameter estimation unit 22 executes the calculation in every sampling interval of the observed value $y={}^t(y_1, y_2, y_3, y_4)$. Discrete time representation of the formula 15 and the formula 39 can be expressed by the following formula.

$$x(k+1) = f(x(k), u(k)) + v(k) \quad (41)$$
$$y(k) = h(x(k)) + w(k)$$

Here, k is a discrete time for every sampling interval, y(k) is a four dimension time series, x(k) is a twelve dimension state vector, and u(k) is a twelve dimension system input vector. x(k) and u(k) are expressed by the following formula.

$$x = {}^t(\theta_{DN}, \dot{\theta}_{DN}, \theta_W, \dot{\theta}_W, \theta_T, \dot{\theta}_T, k_T, \lambda_{\mu x}, F_{zfl}, m, \varphi, V_x) \quad (42)$$
$$= {}^t(x_1, x_2, \ldots, x_{12})$$

$$u = {}^t\left(0, \frac{T_{DNo}}{I_{DN}}, 0, -\frac{T_{brk}}{I_W}, 0, 0, 0, 0, 0, 0, \frac{\pi N_e}{30} \cdot v, 0\right)$$
$$= {}^t(u_1, u_2, \ldots, u_{12})$$

Also, v(k) is a twelve dimension system noise vector whose mean vector is 0 and covariance matrix is represented by Q, and w(k) is a four dimension observation noise vector whose mean vector is 0 and covariance matrix is represented by R. Assuming that v(k) and w(k) are mutually independent Gaussian white noises, they are expressed by the formula 43.

$$E[v(k)] = E[w(k)] = 0 \quad (43)$$

-continued
$$E[(v(k))^T v(k)] = Q, \; E[(w(k))^T w(k)] = R$$

f(x, u) is expressed by a twelve dimension function of the following formula 44 based on the discrete time integration (forward Euler method) of the formula 15. h(x) is a four dimension function represented by the following formula 45. Δt is a discrete time interval (sampling interval).

$$f(x, u) = x + \begin{bmatrix} x_2 \\ \frac{1}{I_{DN}}[x_{10}\sin x_{11} - k_D(x_1 - x_3)] + u_2 \\ x_4 \\ \frac{1}{I_W}[k_D(x_1 - x_3) - x_7(x_3 - x_5)] + \mu_4 \\ x_6 \\ \frac{1}{I_T}[x_7(x_3 - x_5) - R_e(x_9) \cdot F_x(x_7, x_8, x_9, x_4, V_{cxfl}, \hat{\alpha}_f, \hat{\gamma}_{fl})] \\ 0 \\ 0 \\ -\frac{k_f}{(k_f + k_r)} \frac{h}{d_f} m\dot{a}_y - \frac{h}{2l} m\dot{a}_x \\ 0 \\ u_{11} \\ a_x^* \end{bmatrix} \Delta t \tag{44}$$

$$h(x) = \begin{bmatrix} 30x_2/\pi \\ 30x_4/\pi \\ x_8 \\ 3.6x_{12} \end{bmatrix} \tag{45}$$

In the following, a procedure for calculating a state estimation value x^(k) (^ represents a hat operator) by using an Extended Kalman Filter (EKF), which is one type of a nonlinear Kalman filter, will be described.

The initial value x^(0) of the state estimation value x^(k) (^ represents a hat operator) is assumed to be a Gaussian probability vector following N(x₀, Σ0), and is represented by the following formula 46.

$$\hat{x}(0) = E[x(0)] = x_0 \tag{46}$$

$$P(0) = E\left[(x(0) - E[x(0)])(x(0) - E[x(0)])^T\right] = \sum\nolimits_0$$

For k=1, 2, . . . , the prior state estimate x^¯(k) is expressed by the following formula 47.

$$\hat{x}^-(k) = f(\hat{x}(k-1), u(k-1)) \tag{47}$$

Provided that the formula 48 and the formula 49 are derived by linear approximation, a prior error covariance matrix is obtained as shown by the formula 50.

$$A(k-1) = \left.\frac{\partial f(x, u)}{\partial x}\right|_{x=\hat{x}(k-1), u=u(k-1)} \tag{48}$$

$$C^T(k) = \left.\frac{\partial h(x)}{\partial x}\right|_{x=\hat{x}^-(k)} \tag{49}$$

$$= \begin{bmatrix} 0 & \frac{30}{\pi} & 0 & 0 & 0 & 0 & 0 & 0 & 0 & 0 & 0 & 0 \\ 0 & 0 & 0 & \frac{30}{\pi} & 0 & 0 & 0 & 0 & 0 & 0 & 0 & 0 \\ 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 3.6 \end{bmatrix}$$

-continued
$$P^-(k) = A(k-1)P(k-1)A^T(k-1) + Q \tag{50}$$

Accordingly, the Kalman gain matrix G(k) can be expressed by the following formula 51.

$$G(k) = P^-(k)C(k)(C^T(k)P^-(k)C(k)+R(k))^{-1} \tag{51}$$

The state estimation value x^(k) (^ represents a hat operator) is expressed by the following formula 52.

$$\hat{x}(k) = \hat{x}^-(k) + G(k)[y(k) - h(\hat{x}^-(k))] \tag{52}$$

The posterior error covariance matrix P(k) is expressed by the following formula 53.

$$P(k) = (I - G(k)C^T(k))P^-(k) \tag{53}$$

From the foregoing, the state estimation value x^(k) (formula 52) is obtained, whereby the estimated value k^_T of the tire torsional stiffness is obtained as the seventh element of x^(k) and the estimated value λ^_μx of the road surface friction coefficient is obtained as the eighth element of x^(k). In the method using a Kalman filter, it is unnecessary to explicitly obtain the amplitude and phase by frequency analysis, and application is easy even in the transient state.

$$\hat{x}(k) = {}^t(\hat{\theta}_{DN}, \hat{\dot{\theta}}_{DN}, \hat{\theta}_W, \hat{\dot{\theta}}_W, \hat{\theta}_T, \hat{\dot{\theta}}_T, \hat{k}_T, \hat{\lambda}_{\mu x}, \hat{F}_{zfl}, \hat{m}, \hat{\varphi}, \hat{V}_x) \tag{54}$$

An estimated vehicle body speed V*_x is obtained as a weighted average of a first speed acquired by the rear wheel speed sensor 12B and a second speed acquired by integrating the forward-backward acceleration acquired by the acceleration sensor 12D. Also, the weights are set based on the Kalman gain such that the likelihood of the state quantity x(k) is maximized.

By reflecting the tire parameters included in the state estimation value x^(k) in the tire model, the friction damping coefficient c_T ([Nm (rad/s)]) between the tire and the road surface can be represented by the following formula 55.

$$c_T(k_T, \lambda_{\mu x}, F_z, \dot{\theta}_W, V_{cx}, \gamma) = \frac{dT_x}{d\dot{\theta}_s} = \tag{55}$$

$$\frac{R_e^2}{V_{cx}} \cdot \frac{dF_x}{d\kappa} = \frac{R_e^2}{V_{cx}} \cdot \frac{C_x D_x \cos\left[C_x \tan^{-1} B_x \kappa_x - E_x(B_x \kappa_x - \tan^{-1} B_x \kappa_x)\right]}{1 + \left[B_x \kappa_x - E_x(B_x \kappa_x - \tan^{-1} B_x \kappa_x)\right]^2} \times$$

$$\left(B_x - \frac{E_x B_x^3 \kappa_x^2}{1 + B_x^2 \kappa_x^2}\right)$$

Here, κ_x, B_x, C_x, D_x, Ex are expressed by the following formula 56.

$$\kappa_x(\dot{\theta}_W, V_{cx}) = -\frac{V_{cx} - R_e \dot{\theta}_W}{|V_{cx}|} \tag{56}$$

$$B_x(k_T, \lambda_{\mu x}, F_z, \gamma) = \frac{k_T \phi}{2R_e(C_x D_x + \varepsilon_x)}$$

$$C_x = p_{Cx1}$$

$$D_x(\lambda_{\mu x}, F_z, \gamma) = (p_{Dx1} + p_{Dx2}df_z)(1 - p_{Dx3}\gamma^2)\lambda_{\mu x}F_z$$

$$E_x(F_z, \dot{\theta}_W, V_{cx}) = (p_{Ex1} + p_{Ex2}df_z + p_{Ex3}df_z^2)[1 - p_{Ex4}\text{sgn}(\kappa_x)]$$

$$df_z = \frac{F_z - F_{zo}}{F_{zo}}$$

Here, $p_{Cx1}$, $p_{Dx1}$, $p_{Dx2}$, $p_{Dx3}$, $p_{Ex1}$, $p_{Ex2}$, $p_{Ex3}$, and $p_{Ex4}$ are constants.

On the other hand, as described above, once the dimensionless quantity $\zeta_C$ is known, the friction damping coefficient $c_{T_c}$ when the slip state becomes the adhesion limit can be acquired from the formula 8. When the slip state becomes the adhesion limit, the slip ratio $\kappa_x$ in the formula 55 is denoted by $\kappa_c$, and the friction damping coefficient $c_T$ represented by the formula 55 is equal to the friction damping coefficient $c_{T_c}$ when the slip state becomes the adhesion limit, which is obtained from the dimensionless quantity $\zeta_C$, and therefore, the relationship of the following formula 57 is obtained.

$$c_T(\kappa_c) = \frac{R_e^2}{V_{cx}} \cdot \frac{C_x D_x \cos\left[C_x \tan^{-1} B_x \kappa_c - E_x \left(B_x \kappa_c - \tan^{-1} B_x \kappa_c\right)\right]}{1 + \left[B_x \kappa_c - E_x \left(B_x \kappa_c - \tan^{-1} B_x \kappa_c\right)\right]^2} \times \left(B_x - \frac{E_x B_x^3 \kappa_c^2}{1 + B_x^2 \kappa_c^2}\right) \quad (57)$$

$$= \zeta_C \sqrt{I_W k_T} \left(= c_{T_c}\right)$$

Figure 7:
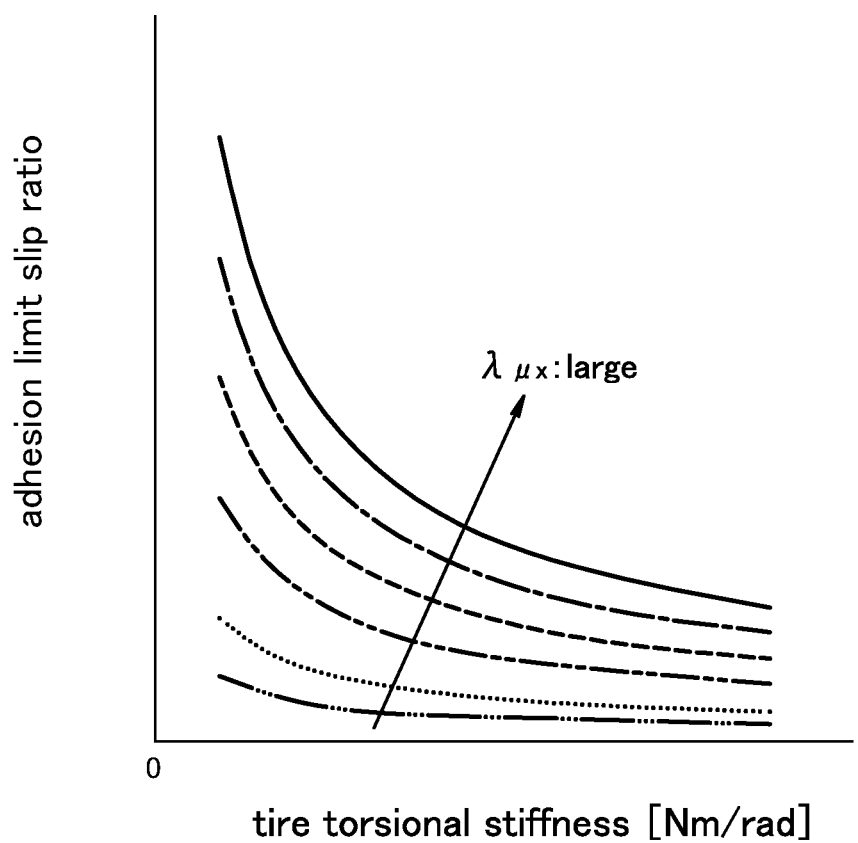
FIG. 7 is a map showing a relationship between a tire torsional stiffness, a road surface friction coefficient, and an adhesion limit slip ratio.

From this formula, it is possible to acquire the adhesion limit slip ratio $\kappa_c$ which is the slip ratio when the slip state becomes the adhesion limit. Preferably, the adhesion limit slip ratio is numerically calculated offline beforehand to be mapped. For example, the adhesion limit slip ratio may be preferably set based on the tire torsional stiffness $k_T$ and the road surface friction coefficient $\lambda_{\mu x}$ by using the map shown in FIG. 7.

Once the adhesion limit slip ratio is determined, based on the tire model represented by the formula 22 to the formula 37, an adhesion limit driving force $F_{xc}$ which is the driving force of the tire corresponding to the adhesion limit $F_x$ is determined. The adhesion limit driving force $F_{xc}$ may be converted to an adhesion limit torque $T_{xc}$ which is a driving torque $T_x$ of the tire corresponding to the adhesion limit. The tire parameter estimation unit 22 may set the adhesion limit driving force $F_{xc}$ according to the tire torsional stiffness $k_T$ and the road surface friction coefficient $\lambda_{\mu x}$ by using the map representing the relationship of the adhesion limit driving force $F_{xc}$ (or the adhesion limit torque $T_{xc}$) with the tire torsional stiffness $k_T$ and the road surface friction coefficient $\lambda_{\mu x}$.

The external environment recognizing unit 31 recognizes, based on the detection result of the external environment detecting device 13, obstacles around the vehicle 1, road shape, presence or absence of sidewalks, and road markings. The obstacles include, for example, guardrails, utility poles, nearby vehicles, persons such as pedestrians. The external environment recognizing unit 31 can acquire a state of each nearby vehicle, such as the position, speed, and acceleration, from the detection result of the external environment detecting device 13. The position of the nearby vehicle may be recognized as a position of a representative point of the nearby vehicle such as the center of gravity or a corner part of the nearby vehicle, or as an area represented by the contour of the nearby vehicle.

The vehicle position recognizing unit 32 recognizes a travel lane, which is the lane on which the vehicle 1 is traveling, and the position and angle of the vehicle 1 relative to the travel lane. For example, the vehicle position recognizing unit 32 may recognize the travel lane based on the map information stored in the map storage unit 14B and the position of the vehicle 1 acquired by the GNSS receiving unit 14A. Also, the vehicle position recognizing unit 32 may recognize the position and angle of the vehicle 1 relative to the travel lane by extracting the delimiting lines provided on the road surface around the vehicle 1 from the map information and comparing the shape of the extracted delimiting lines with the shape of the delimiting lines image-captured by the external camera 13C.

Figure 8:
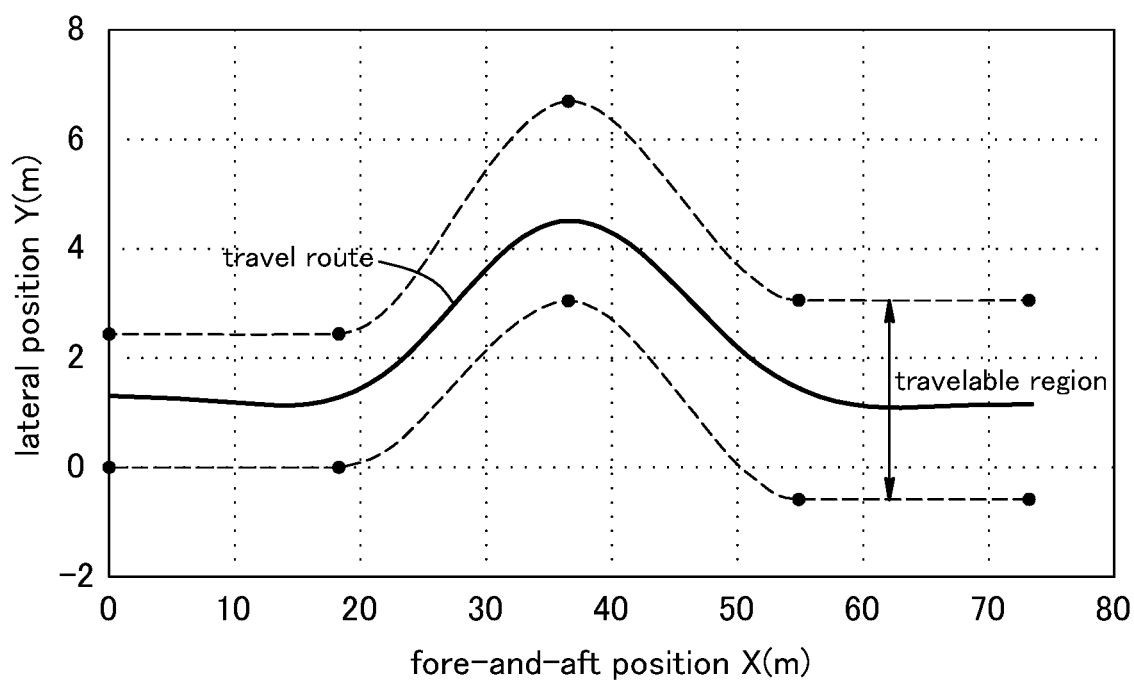
FIG. 8 is an explanatory diagram showing an example of a travelable region having a belt-like shape.
Figure 9:
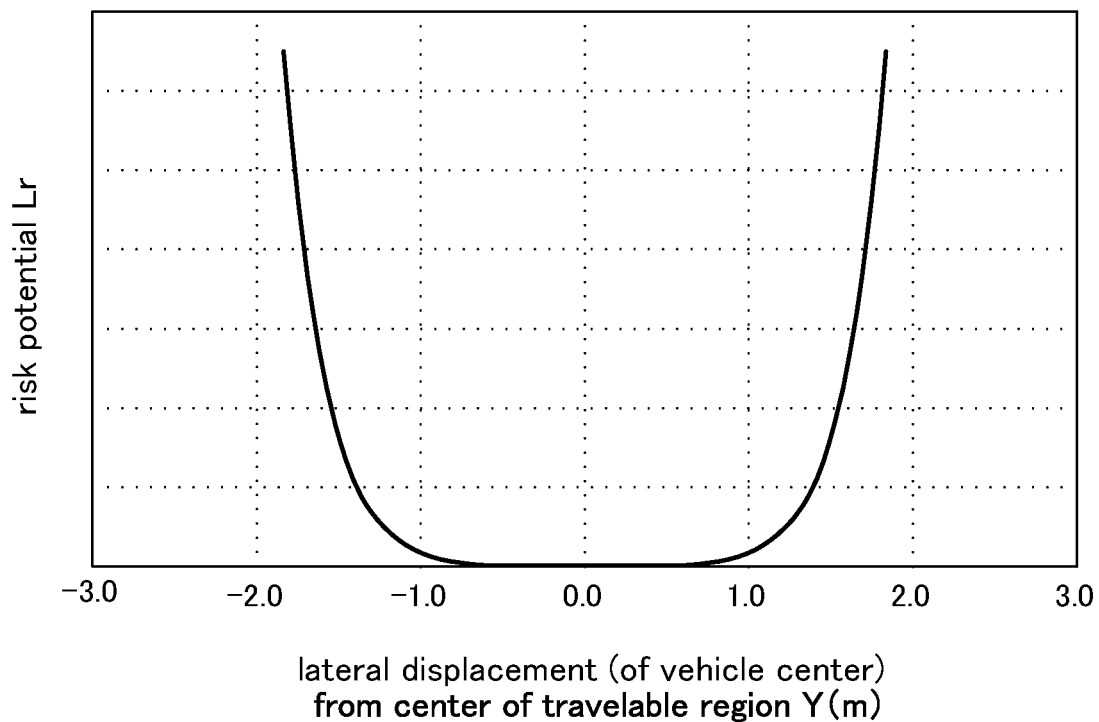
FIG. 9 is a graph showing a relationship between the widthwise position in the travelable region and the risk potential.

The risk potential setting unit 33 creates a risk map based on the information of the obstacles around the vehicle 1 recognized by the external environment recognizing unit 31. The risk map sets a risk potential for each selected position around the own vehicle 1. The risk potential is a numerical value quantifying a risk of collision and is set to a higher value as the risk of collision becomes higher. In the present embodiment, as shown in FIG. 8, the risk potential setting unit 33 sets a belt-shaped travelable region so as not to overlap with the obstacles and sets a risk potential for each selected point included in the travelable region. Preferably, each of the side edges of the travelable region is set to be spaced from the obstacles by a predetermined distance. As shown in FIG. 9, the risk potential is set to be the lowest at the laterally central part of the travelable region and to be the highest at each side edge of the travelable region. Namely, the risk potential is set to increase from the central part toward each side edge.

In another embodiment, the risk potential may be set for each selected point on the road without setting the travelable region. Preferably, the risk potential is set depending on the distance to the obstacles. For example, the risk potential is set to be the highest at the points where the obstacles exist and is set to be lower at points more distant from the obstacles. Also preferably, the risk potential may be set to be higher for points near obstacles approaching the own vehicle 1 based on the velocity of each obstacle relative to the own vehicle 1.

The travel plan unit 34 sequentially creates an action plan for making the vehicle 1 travel along the route. For example, the travel plan unit 34 first determines events for making the vehicle 1 travel in the target lane determined by the route determination unit 14D such that the vehicle 1 does not contact obstacles. The events may include, for example, a constant speed travel event in which the vehicle 1 is caused to travel in the same travel lane at a constant speed, a following travel event in which the vehicle 1 is caused to follow a preceding vehicle traveling in the same travel lane at a speed less than or equal to a set speed set by the occupant or a speed determined based on the environment in which the vehicle 1 is traveling, a lane change event in which the vehicle 1 is caused to change the travel lane thereof, an overtaking event in which the vehicle 1 is caused to overtake a preceding vehicle, a merging event in which the vehicle 1 is caused to merge at a merging point of the road, a branching event in which the vehicle 1 is caused to travel in a target direction at a branching point of the road, an automated driving termination event in which the automated driving is terminated and switched to manual driving, and a vehicle stop event in which the vehicle 1 is caused to stop when, during travel of the vehicle 1, a prescribed condition indicating that it is difficult for the control device 15 or the driver to continue driving is satisfied.

During execution of these events, the travel plan unit 34 may determine an avoidance event to avoid obstacles or the like based on situations near the vehicle 1 (the presence of nearby vehicles and pedestrians, lane narrowing due to road construction, and the like).

The travel plan unit 34 further generates a travel route (target trajectory) along which the vehicle 1 should travel in the future as well as an amount of acceleration and deceleration and an amount of steering at each time point based on the determined events. The travel route is generated as a set of trajectory points arranged in order, where the trajectory points are points that the vehicle 1 should reach at respective future times. The information of the target speed and the target acceleration is represented by the intervals between the trajectory points.

The travel control unit 24 controls the drive source 5, the braking devices 8, and the steering device 9 based on the amount of acceleration and deceleration and the amount of steering at each time point set by the travel plan unit 34. Once the amount of acceleration and deceleration and the amount of steering at each time point are determined, the travel route is determined.

In the following, the procedure of travel control executed by the control device 15 will be described with reference to the flowchart of FIG. 10. First, the risk potential setting unit 33 creates a risk map based on the information of the obstacles around the vehicle 1 recognized by the external environment recognizing unit 31 (S1). As described above, the risk map includes information related to the travelable region and the risk potential at each selected point in the travelable region. Preferably, the risk map is set corresponding to an optimization section which is a section for which the control device 15 should set the travel plan.

Next, the tire parameter estimation unit 22 calculates estimated values of the tire parameters including the tire torsional stiffness $k_{Tfl}$, $k_{Tfr}$, $k_{Trl}$, $k_{Trr}$ and the road surface friction coefficient $\lambda_{\mu fl}$, $\lambda_{\mu fr}$, $\lambda_{\mu rl}$, $\lambda_{\mu rr}$ of each wheel 3 according to the above-described estimation method (S2). The estimated tire torsional stiffness $k_{Tfl}$, $k_{Tfr}$, $k_{Trl}$, $k_{Trr}$ and the estimated road surface friction coefficient $\lambda_{\mu fl}$, $\lambda_{\mu fr}$, $\lambda_{\mu rl}$, $\lambda_{\mu rr}$ of each wheel 3 are regarded as constant values in the optimization section. Note that the suffixes fl, fr, rl, and rr represent the front left wheel, the front right wheel, the rear left wheel, and the rear right wheel, respectively, and this similarly applies to the state quantity which will be described later. Also, when calculation can be performed without distinguishing the wheels, these suffixes are omitted and the calculation result is commonly used for the wheels.

Figure 11:
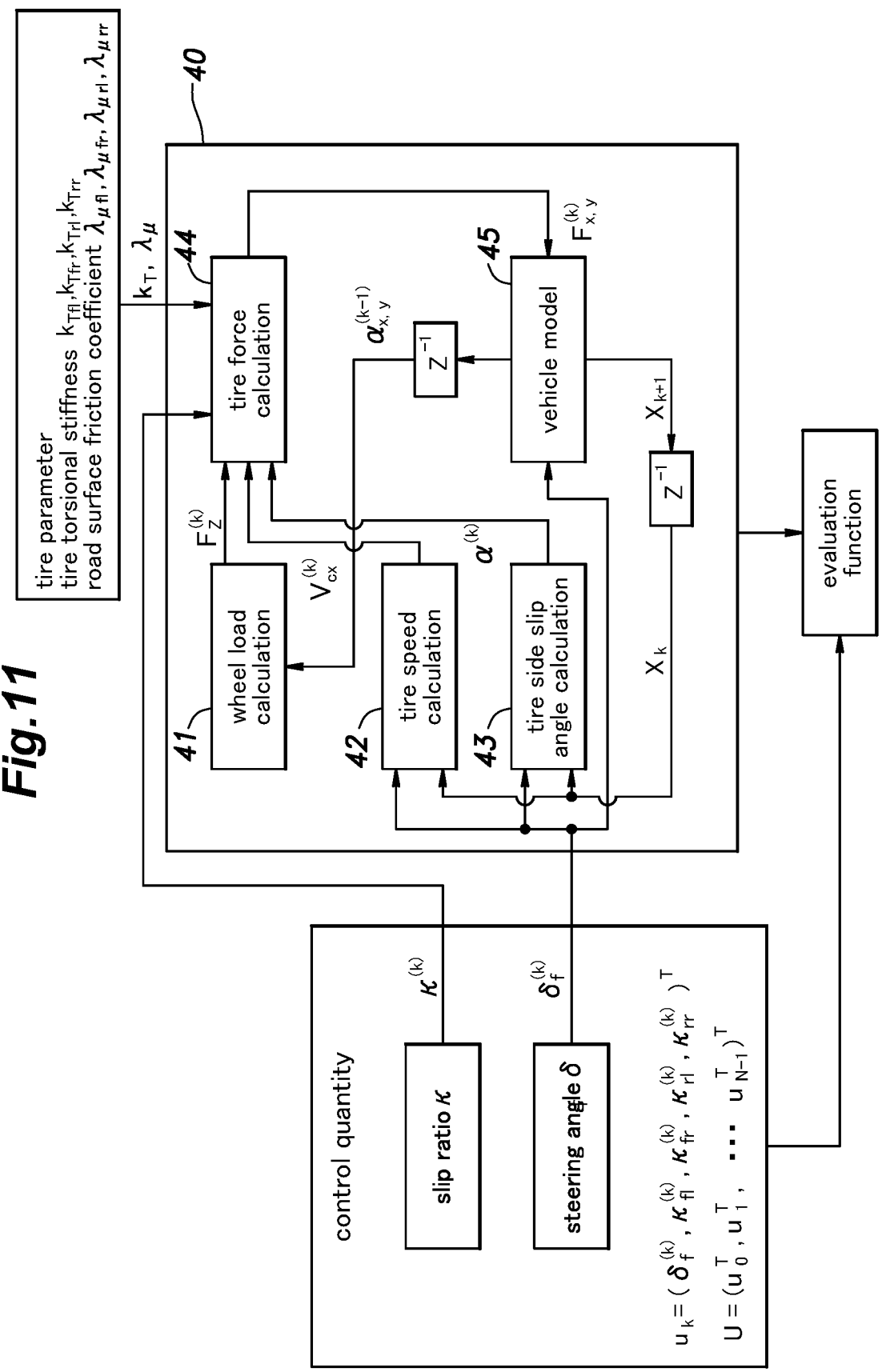
FIG. 11 is an explanatory diagram showing a model.

Next, based on a model 40 and an evaluation function, the travel plan unit 34 searches for a target slip ratio of each wheel 3 and a target steering angle at each time point in the optimization section (S3). The model 40 is set by using the tire torsional stiffness $k_{Tfl}$, $k_{Tfr}$, $k_{Trl}$, $k_{Trr}$ and the road surface friction coefficient $\lambda_{\mu fl}$, $\lambda_{\mu fr}$, $\lambda_{\mu rl}$, $\lambda_{\mu rr}$ estimated by the tire parameter estimation unit 22. As shown in FIG. 11, the model 40 includes a wheel load calculation unit 41, a tire speed calculation unit 42, a tire side slip angle calculation unit 43, a tire force calculation unit 44, and a vehicle model 45.

The model 40 receives, as control quantities (optimization variables), the steering angle $\delta_f^{(k)}$ and the slip ratio $\kappa_{fl}^{(k)}$, $\kappa_{fr}^{(k)}$, $\kappa_{rl}^{(k)}$, $\kappa_{rr}^{(k)}$ of each wheel 3 at each time point in the optimization section. Note that (k) on the right shoulder of each letter represents the k-th calculation result (discrete time k).

The wheel load calculation unit 41 calculates the wheel load $F_z^{(k)}$ of each wheel 3 according to the following formulas 58 and 59.

$$\begin{cases} F_{z_{fl}}^{(k)} = \frac{m_f}{2}g - \frac{k_f}{(k_f+k_r)}\frac{h}{d_f}ma_y^{(k-1)} - \frac{h}{2l}ma_x^{(k-1)} \\ F_{z_{fr}}^{(k)} = \frac{m_f}{2}g + \frac{k_f}{(k_f+k_r)}\frac{h}{d_f}ma_y^{(k-1)} - \frac{h}{2l}ma_x^{(k-1)} \\ F_{z_{rl}}^{(k)} = \frac{m_r}{2}g - \frac{k_r}{(k_f+k_r)}\frac{h}{d_r}ma_y^{(k-1)} + \frac{h}{2l}ma_x^{(k-1)} \\ F_{z_{rr}}^{(k)} = \frac{m_r}{2}g + \frac{k_r}{(k_f+k_r)}\frac{h}{d_r}ma_y^{(k-1)} + \frac{h}{2l}ma_x^{(k-1)} \end{cases} \quad (58)$$

$$m_f = m\frac{l_r}{l}, \; m_r = m\frac{l_f}{l}, \; l = l_f + l_r \quad (59)$$

Here, l is a wheel base [m], $l_f$ is a distance [m] from the center of gravity of the vehicle 1 to the front axle, $l_r$ is a distance [m] from the center of gravity of the vehicle 1 to the rear axle, $d_f$ is a tread width [m] of the front wheel, $d_r$ is a tread width of the rear wheel, $k_f$ is a front roll stiffness [Nm/rad], $k_r$ is a rear roll stiffness [Nm/rad], h is the height of the center of gravity [m], m is a vehicle weight [kg], $a_x^{(k-1)}$ is a forward-backward acceleration of the vehicle body 2, $a_y^{(k-1)}$ is a lateral acceleration of the vehicle body 2. The forward-backward acceleration $a_x^{(k-1)}$ and the lateral acceleration $a_y^{(k-1)}$ are input from the vehicle model 45.

The tire speed calculation unit 42 calculates a longitudinal velocity $V_{cx}^{(k)}$ of each wheel 3 according to the following formula 60.

$$\begin{cases} V_{cx_{fl}}^{(k)} = \left(v_x^{(k)} - \frac{d_f}{2}r^{(k)}\right)\cos\delta_f^{(k)} + \left(v_y^{(k)} + l_f r^{(k)}\right)\sin\delta_f^{(k)} \\ V_{cx_{fr}}^{(k)} = \left(v_x^{(k)} + \frac{d_f}{2}r^{(k)}\right)\cos\delta_f^{(k)} + \left(v_y^{(k)} + l_f r^{(k)}\right)\sin\delta_f^{(k)} \\ V_{cx_{rl}}^{(k)} = \left(v_x^{(k)} - \frac{d_r}{2}r^{(k)}\right)\cos\delta_f^{(k)} + \left(v_y^{(k)} - l_r r^{(k)}\right)\sin\delta_f^{(k)} \\ V_{cx_{rr}}^{(k)} = \left(v_x^{(k)} + \frac{d_r}{2}r^{(k)}\right)\cos\delta_f^{(k)} + \left(v_y^{(k)} - l_r r^{(k)}\right)\sin\delta_f^{(k)} \end{cases} \quad (60)$$

Here, $v_x^{(k)}$ is a forward-backward velocity [m/s] of the vehicle body 2, $v_y^{(k)}$ is a lateral velocity [m/s] of the vehicle body 2. r is a yaw angular velocity [deg/s]. The steering angle $\delta_f^{(k)}$ is input as a variable, and the forward-backward velocity $v_x^{(k)}$ of the vehicle body 2 and the lateral velocity $v_y^{(k)}$ of the vehicle body 2 are input from the vehicle model 45.

The tire side slip angle calculation unit 43 calculates the side slip angle $\alpha^{(k)}$ of each wheel 3 according to the following formula 61.

$$\begin{cases} \alpha_{fl}^{(k)} = \tan^{-1}\frac{v_y^{(k)} + l_f r^{(k)}}{v_x^{(k)} - d_f r^{(k)}/2} - \delta_f^{(k)} \\ \alpha_{fr}^{(k)} = \tan^{-1}\frac{v_y^{(k)} + l_f r^{(k)}}{v_x^{(k)} + d_f r^{(k)}/2} - \delta_f^{(k)} \\ \alpha_{rl}^{(k)} = \tan^{-1}\frac{v_y^{(k)} - l_r r^{(k)}}{v_x^{(k)} - d_r r^{(k)}/2} \\ \alpha_{rr}^{(k)} = \tan^{-1}\frac{v_y^{(k)} - l_r r^{(k)}}{v_x^{(k)} + d_r r^{(k)}/2} \end{cases} \quad (61)$$

The steering angle $\delta_f^{(k)}$ is input as a variable, and the forward-backward velocity $v_x^{(k)}$ of the vehicle body 2 and the lateral velocity $v_y^{(k)}$ of the vehicle body 2 are input from the vehicle model 45.

The tire force calculation unit 44 calculates the front-rear force (driving force) $F_x^{(k)}$ and the lateral force $F_y^{(k)}$ of each wheel 3 based on a modified tire model. As shown in the formula 62 below, the front-rear force $F_x^{(k)}$ and the lateral force $F_y^{(k)}$ of each wheel 3 are calculated based on the tire torsional stiffness $k_T$, the road surface friction coefficient $\lambda_\mu$, the wheel load $F_z^{(k)}$, the longitudinal velocity $V_{cx}^{(k)}$, the slip ratio $\kappa^{(k)}$, and the side slip angle $\alpha^{(k)}$ of each wheel 3.

$$\begin{cases} F_{x_{fl},y_{fl}}^{(k)} = MF_m\!\left(k_{T_{fl}}, \lambda_{\mu_{fl}}, F_{z_{fl}}^{(k)}, V_{cx_{fl}}^{(k)}, \kappa_{fl}^{(k)}, \alpha_{fl}^{(k)}\right) \\ F_{x_{fr},y_{fr}}^{(k)} = MF_m\!\left(k_{T_{fr}}, \lambda_{\mu_{fr}}, F_{z_{fr}}^{(k)}, V_{cx_{fr}}^{(k)}, \kappa_{fr}^{(k)}, \alpha_{fr}^{(k)}\right) \\ F_{x_{rl},y_{rl}}^{(k)} = MF_m\!\left(k_{T_{rl}}, \lambda_{\mu_{rl}}, F_{z_{rl}}^{(k)}, V_{cx_{rl}}^{(k)}, \kappa_{rl}^{(k)}, \alpha_{rl}^{(k)}\right) \\ F_{x_{rr},y_{rr}}^{(k)} = MF_m\!\left(k_{T_{rr}}, \lambda_{\mu_{rr}}, F_{z_{rr}}^{(k)}, V_{cx_{rr}}^{(k)}, \kappa_{rr}^{(k)}, \alpha_{rr}^{(k)}\right) \end{cases} \quad (62)$$

The front-rear force $F_x$ and the lateral force $F_y$ of each wheel 3 in the formula 62 are specifically represented by the following formulas 63 to 109. In the following formulas 63 to 109, p and r with suffixes and $A_\mu$ and $\lambda_{\mu\nu}$ are coefficients having predetermined values.

$$df_z = \frac{F_z - F_{zo}}{F_{zo}} \quad (63)$$

$$\gamma^* = \sin\gamma \quad (64)$$

$$V_{sx} = V_r - V_{cx}(V_r = R_e \theta_W) \quad (65)$$

In the vehicle model 45, the state quantity of the vehicle 1 is calculated from the equation of motion based on the front-rear force $F_x$ and the lateral force $F_y$ of each wheel 3 and the steering angle $\delta_f$ as a control quantity. The equation of motion is represented by the following formulas 110 and 111.

$$a_x^{(k)} = \frac{1}{m}\Big(-F_{y_n}^{(k)}\sin\delta_f^{(k)} - F_{y_{fr}}^{(k)}\sin\delta_f^{(k)} + \qquad (110)$$
$$F_{x_{fl}}^{(k)}\cos\delta_f^{(k)} + F_{x_{fr}}^{(k)}\cos\delta_f^{(k)} + F_{x_{rl}}^{(k)} + F_{x_{rr}}^{(k)} - F_r \operatorname{sgn} v_x^{(k)}\Big)$$

$$a_y^{(k)} = \qquad (111)$$
$$\frac{1}{m}\Big(F_{y_n}^{(k)}\cos\delta_f^{(k)} + F_{y_{fr}}^{(k)}\cos\delta_f^{(k)} + F_{y_{rl}}^{(k)} + F_{y_{rr}}^{(k)} + F_{x_n}^{(k)}\sin\delta_f^{(k)} + F_{x_{fr}}^{(k)}\sin\delta_f^{(k)}\Big)$$

$$M_z = l_f\!\left[\left(F_{x_n}^{(k)} + F_{x_{fr}}^{(k)}\right)\sin\delta_f^{(k)} + \left(F_{y_n}^{(k)} + F_{y_{fr}}^{(k)}\right)\cos\delta_f^{(k)}\right] + \qquad (112)$$
$$\frac{d_f}{2}\!\left(F_{x_{fr}}^{(k)} - F_{x_n}^{(k)}\right)\cos\delta_f^{(k)} + \frac{d_f}{2}\!\left(F_{y_n}^{(k)} - F_{y_{fr}}^{(k)}\right)\sin\delta_f^{(k)} -$$
$$l_r\!\left(F_{y_{rl}}^{(k)} + F_{y_{rr}}^{(k)}\right) + \frac{d_r}{2}\!\left(F_{x_{rr}}^{(k)} - F_{x_{rl}}^{(k)}\right)$$

Here, the travel resistance Fr is expressed by the following formula 113.

$$F_r = \mu_r m + \mu_a A \cdot (3.6 v_x)^2 \quad (113)$$

Here, $\mu_r$ is a rolling resistance coefficient [N/kg], $\mu_a$ is an air resistance coefficient [N/m$^2$/(km/h)$^2$], and A is a front projection area [m$^2$] of the vehicle.

Also, the vehicle model 45 calculates the state quantity of the vehicle 1 at discrete time k+1 from the state quantity of the vehicle 1 at discrete time k according to the following formula 114.

$$x_{k+1} = \begin{bmatrix} X^{(k+1)} \\ Y^{(k+1)} \\ \theta^{(k+1)} \\ v_x^{(k+1)} \\ v_y^{(k+1)} \\ r^{(k+1)} \end{bmatrix} = x_k + \begin{bmatrix} V^{(k)}\cos\theta^{(k)} \\ V^{(k)}\sin\theta^{(k)} \\ r^{(k)} \\ a_x^{(k)} + v_y^{(k)} r^{(k)} \\ a_y^{(k)} - v_x^{(k)} r^{(k)} \\ M_z^{(k)}/I_z \end{bmatrix} \Delta t \quad (114)$$

Here, X-Y is a coordinate system fixed on the ground, and x-y is a coordinate system having an origin at the center of gravity of the vehicle 1, with x being the fore and aft direction of the vehicle 1 and y being a lateral direction perpendicular to x. θ is an angle of the x axis relative to the X axis. V is expressed by the following formula 115.

$$V = \sqrt{v_x^2 + v_y^2} \quad (115)$$

The evaluation function is expressed by J of the formula 117 in which a stage cost L at a certain time point, which is expressed by the formula 116, is integrated with a predetermined time interval T $(=\Delta t \cdot N)$.

$$L = w_r L_r + w_s L_s + w_v L_v \quad (116)$$

$$J(U(t), x(t), t) + \varphi(x_N^*(t)) + \sum_{k=0}^{N-1} L(x_k^*(t), u_k^*(t))\Delta t \quad (117)$$

Here, $W_r$, $W_s$, $W_v$ are weights (coefficients) having predetermined values, $L_r$ is a risk potential, $L_s$ is a slip loss, $L_v$ is a kinetic energy loss. $x_k$ is a state quantity of the vehicle 1 (formula 114), $u_k$ is a control quantity, and t is time. "*" on the right shoulder of each letter indicates that it is a value used in a later optimization calculation, and does not necessarily correspond to the actual value (represented without "*" on the right shoulder). L is a stage cost, and φ is a terminal cost. Since the control quantity $u_N$ influences the state quantity $x_{N+1}$, the control quantities that influence the optimization section are $u_0, u_1, \ldots, u_{N-1}$ (the stage cost L), and the control quantities do not pertain to the terminal cost φ, which is determined by only the state quantity $x_N$.

The risk potential $L_r$ is set by referring to the risk map based on the position $X^{(k)}$, $Y^{(k)}$ of the vehicle 1. As described above, the risk map is created by the risk potential setting unit 33. The smaller the risk potential is, the closer the vehicle 1 is positioned to the central part of the travelable region so that the risk of collision with the obstacles around the vehicle 1 is reduced.

As shown in the following formula 118, the slip loss $L_s$ is defined as a total of the friction losses of the tires of the respective wheels 3. The friction loss of each wheel 3 is expressed by a product of the friction force Ffl, Ffr, Frl, Frr and the slip speed Vsfl, Vsfr, Vsrl, Vsrr of each wheel 3. The smaller the slip loss becomes, the smaller the sliding slip of each wheel 3 becomes so that the behavior of the vehicle 1 becomes stable. Note that when the slip ratio of the tire of each wheel 3 is less than or equal to the adhesion limit slip ratio, the slip speed also is within the adhesion limit, and therefore, the slip loss is sufficiently small and the behavior of the vehicle 1 is stable.

$$L_s = F_{fl} V_{sfl} + F_{fr} V_{sfr} + F_{rl} V_{srl} + F_{rr} V_{srr}$$
$$\left(F = \sqrt{F_x^2 + F_y^2},\, V_s = \sqrt{V_{sx}^2 + V_{sy}^2}\right) \quad (118)$$

The kinetic energy loss $L_v$ is defined by an amount of decrease of the kinetic energy relative to the initial condition (k=0). For example, the kinetic energy loss $L_v$ may be defined as shown by the formula 119. The smaller the kinetic energy loss is, the more the deceleration of the vehicle 1 is suppressed.

$$L_v = \max\left\{\frac{1}{2T}m(v_{xo}^2 - v_x^2), 0\right\} \quad (119)$$

Here, T represents a time interval.

In situations such as emergency collision avoidance, it is necessary to evaluate an overall avoidance action, not an instantaneous performance. Therefore, it is necessary to search for a combination of control quantities (optimization variables) (the steering angle $\delta_f^{(k)}$ input to the vehicle at a certain time k and distribution of the slip ratios $\kappa_{fl}^{(k)}$, $\kappa_{fr}^{(k)}$, $\kappa_{rl}^{(k)}$, $\kappa_{rr}^{(k)}$ of the respective wheels 3 as well as their time change) that minimizes J (see the formula 117) which is calculated by integrating the stage cost L at a certain time point (see the formula 116) with a predetermined time interval T (=Δt·N). The time series function U of the control quantities is expressed by the following formula 120.

$$U=(u_0^T, u_1^T, \ldots, u_{N-1}^T)^T \quad (120)$$

Here, $u_k$ (k=0, 1, ..., N−1) is a control quantity input to the vehicle at a certain time k and is expressed by the following formula 121.

$$u_k=(\delta_f^{(k)}, \kappa_{fl}^{(k)}, \kappa_{fr}^{(k)}, \kappa_{rl}^{(k)}, \kappa_{rr}^{(k)})^T \quad (121)$$

The necessary optimality condition of the evaluation function is expressed by the following formulas 122 to 125.

$$x^*_0(t)=x(t), x^*_{k+1}(t)=x^*_k(t)+f(x^*_k(t), u^*_k(t))\Delta t \quad (122)$$

Here, $x_0^*$ is an initial value and is given by inputting the state quantity x(t) observed at the current time t.

$$\lambda_k^*(t) = \lambda_{k+1}^*(t) + \left(\frac{\partial H}{\partial x}\right)^T (x_k^*(t), u_k^*(t), \lambda_{k+1}^*(t), \mu_k^*(t))\Delta t, \quad (123)$$

$$\lambda_N^*(t) = \left(\frac{\partial \varphi}{\partial x}\right)^T (x_N^*(t))$$

$$\frac{\partial H}{\partial u}(x_k^*(t), u_k^*(t), \lambda_{k+1}^*(t), \mu_k^*(t)) = 0, C(x_k^*(t), u_k^*(t)) = 0 \quad (124)$$

Here, λ, is the costate, H is the Hamiltonian, and C is the restraint condition. The Hamiltonian is represented by the following formula 125.

$$H(x,u,\lambda,\mu)=L(x,u)+\lambda^T f(x,u)+\mu^T C(x,u) \quad (125)$$

In the search for the control quantities that minimize the evaluation function, sequential quadratic programming (SQP) may be used, for example. Also, for the purpose of reducing the processing load of the control device 15, C/GMRES method may be used. In either calculation method, control quantities are searched for using the state quantity x(t) observed at the current time t as an initial value (formula 122). Therefore, by feedback of the successively observed state quantities, it is possible to correct the influence by disturbances.

Figure 10:
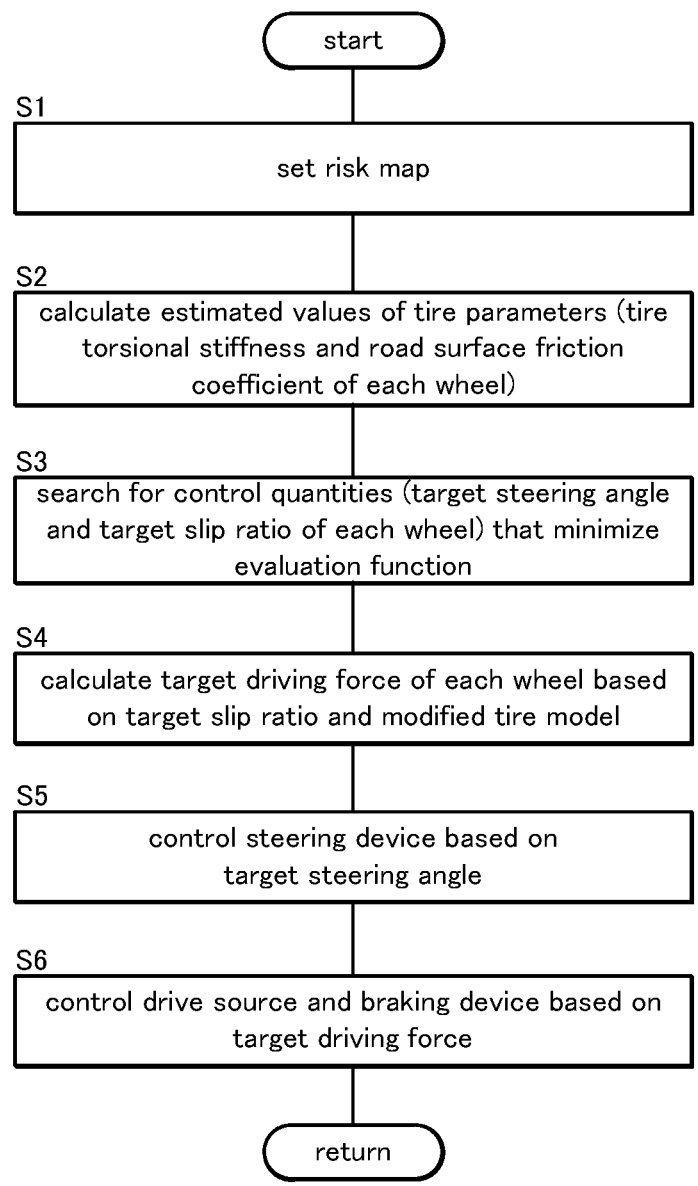
FIG. 10 is a flowchart showing a travel control procedure.

Next, as shown in FIG. 10, by inputting the target (optimal) slip ratio of each wheel 3 at each time point when the evaluation function J is minimized into the modified tire model, the control device 15 calculates a target driving force (required driving force) of each wheel 3 at each time point (S4). The driving force of each wheel 3 is represented by the following formula 126.

$$F_{x_{ref}}=F_x(k_T, \lambda_\psi, F_{z_{opt}}, V_{cx_{opt}}, \kappa_{opt}, \alpha_{opt}, \gamma_{opt}) \quad (126)$$

Here, the suffix "opt" means that they are values optimized by the target slip ratio and the target steering angle.

Next, based on the target steering angle at each time point when the evaluation function J is minimized, the control device 15 controls the steering device 9 so as to make the actual steering angle correspond to the target steering angle (S5).

Next, based on the target driving force of each wheel 3 at each time point calculated in step S4, the control device 15 controls the torques of the drive source 5 and the braking device 8 (S6). The drive source 5 adjusts the positive driving force given to the front wheels 3F by increasing/decreasing the output. Also, the drive source 5 adjusts the negative driving force given to the front wheels 3F by increasing/decreasing an amount of engine braking and an amount of regeneration. The braking device 8 adjusts the negative driving force of each of the wheels 3 including the front wheels 3F and the rear wheels 3R by increasing/decreasing the braking torque.

With the control device 15 executing the travel control described above, the vehicle 1 can travel so as to keep a safe distance from the obstacles around it, to stabilize the vehicle behavior by suppressing the sliding slip, and to suppress deceleration.

Figure 12:
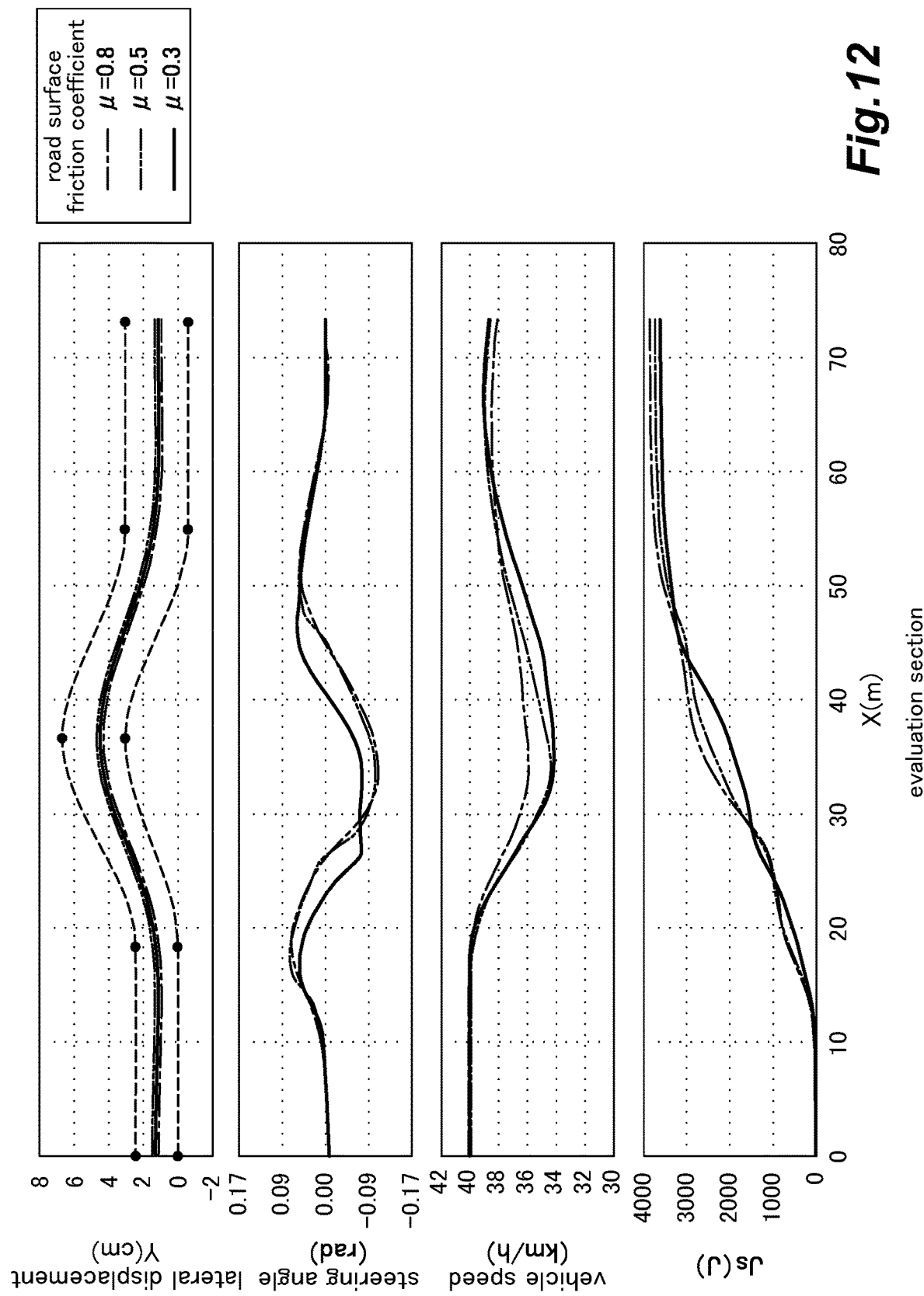
FIG. 12 is a graph showing a lateral displacement, a steering angle, a vehicle speed, and a cumulative value of a tire slip loss in an evaluation section X when the road surface friction coefficient changes.

FIG. 12 is a graph showing the lateral direction displacement Y(m), the steering angle (rad), the vehicle speed (km/h), and the cumulative value Js of the tire slip loss (J) in an evaluation section X (forward distance) when the evaluation function is minimized, in each of the cases where the road surface friction coefficient is 0.8, where the road surface friction coefficient is 0.5, and the road surface friction coefficient is 0.3. From FIG. 12, it can be appreciated that irrespective of the value of the road surface friction coefficient, the vehicle 1 can travel approximately in the center of the travelable region. At this time, the smaller the road surface friction coefficient is, the longer the deceleration section becomes and the earlier the steering timing becomes. However, in the case where the road surface friction coefficient is 0.5 also, the deceleration section is long, and therefore, the tire slip loss is suppressed.

Figure 13:
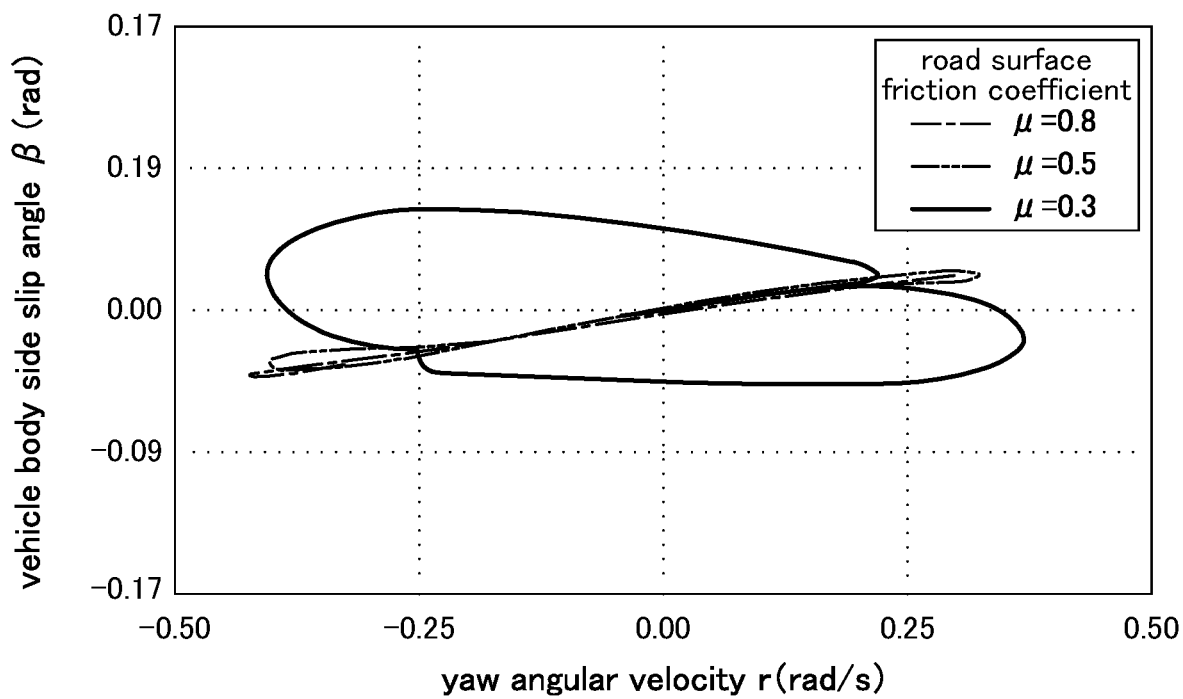
FIG. 13 is a graph showing an effect of the travel control when the road surface friction coefficient changes.

FIG. 13 is a graph showing the effect of the travel control for different road surface friction coefficients. When the road surface friction coefficient μ is 0.8 or 0.5, the vehicle body side slip angle changes linearly with the yaw angular velocity and the value thereof is small. In this case, the tire friction is suppressed to be within the adhesion limit, and consistent and stable vehicle behavior is realized. When the road surface friction coefficient μ is 0.3, if the tire friction is suppressed to be within the adhesion limit, the vehicle may deviate from the travelable region, and therefore, control is conducted so as to minimize the deviation from the adhesion limit. As a result, the vehicle body side slip angle does not change linearly with the yaw angular velocity but does not diverge, and the maximum value of the vehicle body side slip angle is suppressed similarly to when the road surface friction coefficient μ is 0.8 or 0.5. Namely, although the consistency of ride feeling may be impaired, stable vehicle behavior is maintained. In this way, when the road surface friction coefficient is low, the control device 15 can improve the stability and achieve safe automated driving.

According to the above-described embodiment, it is possible to provide a vehicle control system capable of setting a travel route along which the vehicle 1 can travel with stable vehicle behavior. Since the travel plan unit sets the travel route, the amount of acceleration and deceleration, and the amount of turning so as to suppress the excess amount of the slip ratio of the tire relative to the adhesion limit slip ratio, the sliding slip is suppressed and the stability of the vehicle behavior is improved. Further, since the travel plan unit sets the travel route, the amount of acceleration and deceleration, and the amount of turning based on the tire parameters estimated by the tire parameter estimation means, the vehicle 1 can stabilize the vehicle behavior while traveling along the travel route even if the road surface condition changes. Owing to the suppression of the sliding slip, even when the travel route is changed suddenly due to an obstacle while the vehicle 1 is traveling along the travel route, the vehicle 1 can stabilize the vehicle behavior while travel. Also, owing to the suppression of the sliding slip, even when the vehicle speed is higher than the target vehicle speed while the vehicle 1 is traveling along the travel route, the vehicle 1 can stabilize the vehicle behavior while traveling.

The travel control system 10 sets the travel route, the amount of acceleration and deceleration, and the amount of turning so as to minimize the evaluation function (see the formula 116) which takes into account the risk potential, the tire slip loss, and the kinetic energy loss. Therefore, the travel control system 10 can set a travel route which can widen the spacing between the vehicle 1 and the obstacle and along which the vehicle 1 can travel with stable vehicle behavior and with a small deceleration. Also, by changing the first coefficient, the second coefficient, and the third coefficient, it is possible to adjust the influence of the risk potential, tire slip loss, and kinetic energy loss on the evaluation function.

The control device 15 acquires the slip ratio and the steering angle of the tire of each wheel 3 when the evaluation function is minimized and controls at least one of the drive source 5 and the braking device 8 such that the actual driving force of the tire corresponds to the required driving force. Since the drive source 5 and the braking device 8 are controlled based on the required driving force of the tire, the control error can be reduced. In a comparative case where control were conducted to make the actual slip ratio correspond to the target slip ratio, if the tire model (relationship between the slip ratio and the driving force) includes an error, an error will occur in the travel route. In contrast, in the case where control is conducted to make the actual driving force of the tire correspond to the required driving force, if the tire model includes an error, an error may occur in the tire slip loss but the influence on the travel route is small.

Concrete embodiments have been described in the foregoing, but the present invention is not limited to the above embodiments and may be modified or altered in various ways. In another embodiment, the tire parameter estimation unit 22 may estimate the road surface friction coefficient and the tire torsional stiffness by using various known methods. For example, the tire parameter estimation unit 22 may estimate the road surface friction coefficient based on a detection value of a sensor for detecting the road surface condition. Also, the tire parameter estimation unit 22 may estimate the tire torsional stiffness based on the air pressure and the like.

The invention claimed is:

1. A travel control system for a vehicle including a drive source, a wheel including a wheel body connected to the drive source via a power transmission member, a tire mounted on the wheel body, and a braking device for braking rotations of the wheel, the vehicle comprising:
a drive source rotation speed sensor configured to detect a rotation speed of an output end of the drive source;
a wheel speed sensor that detects the rotation speed of the wheel body;
a torque acquisition unit that acquires a torque applied to the wheel body;
an external environment recognizing means that recognizes an obstacle around the vehicle;
a tire parameter estimation means that estimates a tire parameter of the tire of the vehicle; and
a travel plan means that sets a travel route, an amount of acceleration and deceleration, and an amount of turning based on the obstacle and the tire parameter,
wherein the travel plan means sets the travel route, the amount of acceleration and deceleration, and the amount of turning so as to suppress an excess amount of a slip ratio of the tire relative to an adhesion limit slip ratio while avoiding approach to the obstacle,
the tire parameter includes a tire torsional stiffness which is a stiffness of the tire and a road surface friction coefficient which represents friction characteristics between the tire and a road surface,
the tire parameter estimation means estimates the tire torsional stiffness and the road surface friction coefficient by identifying a dynamic model from the drive source to the contact surface between the tire and the road surface based on at least a rotation speed of a drive source, a rotation speed of a wheel body of the tire, a vehicle body speed, and a torque of the wheel body, and
the tire parameter estimation means estimates the adhesion limit slip ratio corresponding to an adhesion limit of the tire relative to the road surface based on the tire torsional stiffness and the road surface friction coefficient,
the travel plan means sets the travel route, the amount of acceleration and deceleration, and the amount of turning so as to minimize an evaluation function which is a total of a value obtained by multiplying a risk potential based on a distance between the obstacle and the vehicle by a first coefficient, a value obtained by multiplying a slip loss of the tire by a second coefficient, and a value obtained by multiplying a kinetic energy loss which is an amount of decrease of kinetic energy of the vehicle by a third coefficient.

2. The travel control system according to claim 1, wherein the travel plan means sets the travel route, the amount of acceleration and deceleration, and the amount of turning so as to minimize an evaluation function which is a total of a value obtained by multiplying a risk potential based on a distance between the obstacle and the vehicle by a first coefficient and a value obtained by multiplying a slip loss which increases according to a sliding slip of the tire by a second coefficient.

3. The travel control system according to claim 2, further comprising a travel control means that controls a drive source, a braking device, and a steering device,
wherein the travel plan means sets a target slip ratio of the tire and a target steering angle when the evaluation function is minimized and calculates a required driving force of the tire based on the target slip ratio, and
the travel control means controls the steering device such that an actual steering angle of the tire corresponds to the target steering angle and controls at least one of the drive source and the braking device such that an actual driving force of the tire corresponds to the required driving force.

4. A travel control method to be executed by a travel control system for a vehicle, the method comprising:
recognizing an obstacle around the vehicle;

estimating a tire torsional stiffness which is a stiffness of a tire of the vehicle and a road surface friction coefficient which represents friction characteristics between the tire and a road surface by identifying a dynamic model from the drive source to the contact surface between the tire and the road surface based on at least a rotation speed of a drive source, a rotation speed of a wheel body of the tire, a vehicle body speed, and a torque of the wheel body;

estimating an adhesion limit slip ratio corresponding to an adhesion limit of the tire relative to the road surface based on the tire torsional stiffness and the road surface friction coefficient; and setting a travel route, an amount of acceleration and deceleration, and an amount of turning based on the obstacle and the adhesion limit slip ratio so as to suppress an excess amount of a slip ratio of the tire relative to the adhesion limit slip ratio while avoiding approach to the obstacle, wherein the travel route, the amount of acceleration and deceleration, and the amount of turning are set so as to minimize an evaluation function which is a total of a value obtained by multiplying a risk potential based on a distance between the obstacle and the vehicle by a first coefficient, a value obtained by multiplying a slip loss of the tire by a second coefficient, and a value obtained by multiplying an amount of decrease of kinetic energy of the vehicle by a third coefficient.

5. The travel control method according to claim 4, comprising:

setting a target slip ratio of the tire and a target steering angle when the evaluation function is minimized and calculating a required driving force of the tire based on the target slip ratio; and controlling a steering device such that an actual steering angle of the tire corresponds to the target steering angle and controlling at least one of a drive source and a braking device such that an actual driving force of the tire corresponds to the required driving force.

6. The travel control method according to claim 4, wherein the dynamic model is represented by a following a formula:

$$\left. \begin{array}{l} I_W \ddot{\theta}_W = k_D(\theta_{DN} - \theta_W) - k_T(\theta_W - \theta_T) \\ I_T \ddot{\theta}_T = k_T(\theta_W - \theta_T) - c_T \dot{\theta}_T \end{array} \right\}$$

wherein $\theta_{DN}$ is a rotation angle perturbation [rad] of the output shaft of the drive source, $\theta_W$ is a rotation angle perturbation [rad] of the wheel body, $\theta_T$ is a rotation angle perturbation [rad] of the tire, $I_W$ is a moment of inertia [kgm$^2$] of the wheel body, $I_T$ is a moment of inertia [kgm$^2$] of the tire, and $k_D$ is a torsional stiffness [Nm/rad] of the power transmission member, $k_T$ is a torsional stiffness [Nm/rad] of the tire T, and $c_T$ is a friction damping coefficient [Nm/(rad/s)] between the tire and the road surface.

7. A travel control system for a vehicle including a drive source, a wheel including a wheel body connected to the drive source via a power transmission member, a tire mounted on the wheel body, and a braking device for braking rotations of the wheel, the vehicle comprising:

a drive source rotation speed sensor configured to detect a rotation speed of an output end of the drive source;

a wheel speed sensor that detects the rotation speed of the wheel body;

a torque acquisition unit that acquires a torque applied to the wheel body;

an external environment recognizing means that recognizes an obstacle around the vehicle;

a tire parameter estimation means that estimates a tire parameter of the tire of the vehicle; and a travel plan means that sets a travel route, an amount of acceleration and deceleration, and an amount of turning based on the obstacle and the tire parameter, wherein the travel plan means sets the travel route, the amount of acceleration and deceleration, and the amount of turning so as to suppress an excess amount of a slip ratio of the tire relative to an adhesion limit slip ratio while avoiding approach to the obstacle, the tire parameter includes a tire torsional stiffness which is a stiffness of the tire and a road surface friction coefficient which represents friction characteristics between the tire and a road surface, the tire parameter estimation means estimates the tire torsional stiffness and the road surface friction coefficient by identifying a dynamic model from the drive source to the contact surface between the tire and the road surface based on at least a rotation speed of a drive source, a rotation speed of a wheel body of the tire, a vehicle body speed, and a torque of the wheel body, and the tire parameter estimation means estimates the adhesion limit slip ratio corresponding to an adhesion limit of the tire relative to the road surface based on the tire torsional stiffness and the road surface friction coefficient, wherein the dynamic model is represented by a following a formula:

$$\left. \begin{array}{l} I_W \ddot{\theta}_W = k_D(\theta_{DN} - \theta_W) - k_T(\theta_W - \theta_T) \\ I_T \ddot{\theta}_T = k_T(\theta_W - \theta_T) - c_T \dot{\theta}_T \end{array} \right\}$$

wherein $\theta_{DN}$ is a rotation angle perturbation [rad] of the output shaft of the drive source, $\theta_W$ is a rotation angle perturbation [rad] of the wheel body, $\theta_T$ is a rotation angle perturbation [rad] of the tire, $I_W$ is a moment of inertia [kgm$^2$] of the wheel body, $I_T$ is a moment of inertia [kgm$^2$] of the tire, and $k_D$ is a torsional stiffness [Nm/rad] of the power transmission member, $k_T$ is a torsional stiffness [Nm/rad] of the tire T, and $c_T$ is a friction damping coefficient [Nm/(rad/s)] between the tire and the road surface.

* * * * *